United States Patent [19]

Mitsuhashi

[11] Patent Number: 5,404,310
[45] Date of Patent: Apr. 4, 1995

[54] METHOD AND APPARATUS FOR POWER-SOURCE WIRING DESIGN OF SEMICONDUCTOR INTEGRATED CIRCUITS

[75] Inventor: Takashi Mitsuhashi, Kanagawa, Japan

[73] Assignee: Kabushiki Kaisha Toshiba, Kawasaki, Japan

[21] Appl. No.: 599,030

[22] Filed: Oct. 17, 1990

[30] Foreign Application Priority Data

Oct. 17, 1989 [JP] Japan .................................. 1-268193
Jul. 13, 1990 [JP] Japan .................................. 2-183981

[51] Int. Cl.⁶ ............................................. G06F 15/60
[52] U.S. Cl. ..................................... 364/490; 364/489; 364/488
[58] Field of Search ................. 364/488, 489, 490, 491

[56] References Cited

U.S. PATENT DOCUMENTS

| | | | |
|---|---|---|---|
| T 940,015 | 11/1975 | Ho et al. | 364/488 |
| 3,683,417 | 8/1972 | Gummel | 364/488 |
| 4,698,760 | 10/1987 | Lembach et al. | 364/490 |
| 4,802,099 | 1/1989 | Logue | 364/491 |
| 4,811,237 | 3/1989 | Putatunda et al. | 364/491 |
| 4,827,428 | 5/1989 | Dunlop et al. | 364/491 |

FOREIGN PATENT DOCUMENTS

64-61929 3/1989 Japan .......................... H01L 21/82

OTHER PUBLICATIONS

"Electrical Optimization of PLAs" by Hedlund, IEEE 22nd Design Automation Conf., 1985, pp. 681–686.
"Analytical Power/Timing Optimization Technique for Digital System" by Ruehli et al., IEEE 14th Design Automation Conf., 1977, pp. 142–146.
"LAS: Layout Pattern Analysis System with New Approach" by Okamura et al., IEEE 1982, pp. 308–311.
"EXCL: A Circuit Extractor for IC Designs" by S.P. McCormick, IEEE 21st Design Automation Conf., 1984, pp. 616–623.
Chennel Routing in a General Cell Environment, U. Lauther, Proc. IFIP TC10/WG 10.5 (VLSI 85) pp. 389–399.
Calahan, "Computer Aided Network Design", McGraw-Hill 1972.
C. Mead and L. Conway, "Introduction to VLSI Systems", Addison-Wesley, 1990.
N. Weste & K. Eshraghian, "Principles of CMOS Design: A Systems Perspective", Addison-Wesley, 1985.
Hori and Wamura, "Switching Probability of Logic Circuits", Japan Meeting 2/67 of Electronic Communication Meeting '60.

(List continued on next page.)

*Primary Examiner*—Vincent N. Trans
*Attorney, Agent, or Firm*—Foley & Lardner

[57] ABSTRACT

Disclosed is an apparatus for power-source wiring design of semiconductor integrated circuits including a theoretical lattice setting device for setting lattice to divide the surface of a semiconductor substrate sectional regions, an extracting device for extracting electric characteristics of each sectional region, and an operation device for obtaining circuit characteristics of each sectional region. Also disclosed is an apparatus for power-source wiring design of semiconductor integrated circuits comprising a trial circuit generating device for generating a circuit model of power-source.-ground wiring of a semiconductor integrated circuit on trial, an analysis device for analyzing electric characteristics of each sectional region of the circuit model, and a comparison device for comparing the analysis result of electric characteristics obtained by the analysis device to the circuit model with an analysis result of electric characteristics previously obtained by the analysis device to a circuit model previously obtained, and estimating the former analysis result, and an improving plan generating device for generating information of a plan to improve the circuit model preferably in accordance with the comparison estimation result by the comparison device, and giving the information to the trial circuit generating device.

17 Claims, 16 Drawing Sheets

OTHER PUBLICATIONS

Rothermel and Mlynski, "Computation of Power Supply Nets in VLSI Layout", 18th Design Automation Conference3, 1981.

Syed and Gamal, "Single Layer Routing of Power and Ground Networks in Integrated Circuits", Journal of Digital Systems, vol. VI, No. 1, 1982.

Xiong and Kuh, "The Scan Line Approach to Power and Ground Routing", Electronics Research Laboratory, University of California, 1986.

Haruyama and Fussell, "A New Area-Efficient Power Routing Algorithm for VLSI Layout", Department of Computer Science, The University of Texas at Austin, 1987.

Chowdhury and Breuer, "Minimal Area Design of Power/Ground Nets Having Graph Topologies", IEEE Transactions on Circuits and Systems, vol. CAS-34, No. 12, Dec. 1987.

Dutta and Marek-Sadowska, "Automatic Sizing of Power/Ground (P/G) Networks in VLSI", 26th ACM-/IEEE Design Automation Conference.

Erhard and Johannes, "Area Minimization of IC Power/Ground Nets by Topology Optimization", VLSI 91.

0.0~0.05
0.05~0.10
0.10~0.15
0.15~0.20
0.20~

METHOD AND APPARATUS FOR POWER-SOURCE WIRING DESIGN OF SEMICONDUCTOR INTEGRATED CIRCUITS

BACKGROUND OF THE INVENTION

1. Field of the Invention

The present invention relates to a computer aided method for power-source wiring design of semiconductor integrated circuits, and also relates to a computer aided apparatus therefor.

2. Description of the Prior Art

In layout design of large scale integrated circuits, computer aided layout systems are widely used. In a conventional layout system, the layout procedure includes deciding a rough layout on a chip by a floor plan, and deciding channel of special wires such as a power source line and clocks, then deciding details of arrangement of general cells in accordance with the floor plan, so as to complete wiring.

Conventionally, with respect to the general wiring, various automatic wiring algorithms have been proposed and utilized. However, with respect to the power source wiring, since electric currents flowing in respective portions are different from one another, the widths of respective wires should be changed in accordance with respective amounts of the currents. Accordingly, it is very difficult to automatically design the wiring, and thus there are few methods of the power source wiring. Among them, is a a method of power source wiring in which the width of each wire is changed in accordance with an amount of an electric current, proposed by Ulrich Lauther in a report entitled "CHANNEL ROUTING IN A CELL ENVIRONMENT" in (VLSI 85: Proc. IFIP TC10/WG10.5 INT'L CONF. on VLSI, pp. 389-399, Tokyo JAPAN, Aug. 1985).

According to the report, the method is used under the condition of metal one-layer wiring, and has a special tree structure of power-source.ground wiring, so as not to generate shorts. Moreover, the width of each wire is decided by estimating each amount of currents flowing in the power-source.ground wires.

For gate arrays and the like, another method of power-source.ground wiring has been adopted. The method of power-source.ground wiring widely used for gate arrays is called macro cell, in which elements having independent functions are arranged in rows or lines, and power source lines and ground lines are provided over the arrangement. Moreover, in some standard cell system, the power source lines and the ground lines are projected from sides of each macro cell, so that the power-source.ground wiring over the entire body of a standard cell can be constructed only by arranging respective macro cells such that each adjacent pair of the cells are in contact with each other through their sides.

In production of semiconductor integrated circuits in such a gate array or standard cell system, typically, two or more metal wiring layers are used. Accordingly, there are many cases in which uses of the wiring layers are divided. For example, the vertical power-source.ground wiring is provided in the first wiring layer and the horizontal is provided in the second and the like.

In designing integrated circuits of the gate array or standard cell system, since a space capable of use for wiring is very small, it is preferred that the width of the power-source.ground wiring be reduced. However, when the width of wiring becomes too small, electromigration is likely to be caused. Accordingly, the current amount must be restricted so that it becomes difficult to provide the necessary amount of current. Further, the electric potential of the power source or ground is likely be changed by the wiring resistance. To avoid these problems, there is known a method in which compensation of the power source is carried out by wiring provided in another layer oriented vertically to the original power-source.ground wiring. However, the compensation of the power source requires a considerably wide space, so that it is very difficult to automatically design a suitable wiring structure while assuring satisfactory characteristics and reliability. Accordingly, to actually carry out the wiring method, the design must be directly dealt with by a designer with a graphic editor and the like.

Since the power consumption of a semiconductor integrated circuit and the amount of a current flowing in the power source lines change in respective regions in a chip, if it is possible to compensate the power source in accordance with distribution of the power consumption in the chip, the space can be more effectively used for the wiring.

With respect to a method for exactly estimating information concerning the power consumption from load capacitance, respective sizes of transistors and frequency of switching, the principles are partly introduced in "Switching Probability of Logic Circuits" reported by Hori et al. in the semiconductor material section at the all Japan meeting 2-67 of Electronic Communication Meeting '60 or in page 340 of "Introduction to VLSI systems" Addison-Wesley 1980 written by Carver Mead et al. However, to unify these principles as a CAD system so that designers can use the system with ease, various technological difficulties still remain.

Therefore, such an estimation means has not been practically used for the design, in almost all cases, the width of power-source.ground wiring has been manually decided by calculating the power consumption of respective portions in a logic circuit. Moreover, in the design of semiconductor circuits by the gate array or standard cell system, automatic layout is frequently utilized. Therefore, the mutual relation between the manually-decided portions and the automatic layout portions in a logic circuit is likely to be unclear, so that it becomes difficult to manually estimate power consumption of the respective automatic layout portions. As a result, failure of the design is likely. To avoid such failure, the power-source compensation is provided as large as possible in number after wiring, and the effect is not necessarily obtained quantitatively.

Moreover, among methods of optimizing semiconductor circuits, there is known a method in which a non-linear optimization technique is used, as reported in Chapter 6 of "Computer-Aided Network Design", McGraw-Hill, USA (1972) written by Donald A. Calahan. However, the object of these method does not relate to the wiring of power source lines and ground lines, but focuses on optimizing signals to be processed in a circuit. In this case, the compensation technique method by changing connection structure or addition of power source lines is not considered. Accordingly, this method is also insufficient as a method of actually optimizing the power source lines.

As stated above, in the layout design of ASIC by conventional methods of designing power source wiring, it is very difficult to provide the most suitable and effective wiring on a chip, in view of maldistribution of the power consumption thereon, without using unnecessary power source lines and ground lines, and it is also difficult to decide power-source.ground channels having satisfactory electric characteristics and life span.

To solve these problems, it is necessary to develop a method for calculating the power consumption and the maximum current amount in respective regions of a chip with high accuracy, a method and an apparatus for deciding a necessary power-source.ground wiring mode from the power consumption and current amounts of the respective regions, and automatically realizing the mode in a layout, and a method and apparatus for displaying the layout pattern on an interactive apparatus so that designers can well recognize it.

SUMMARY OF THE INVENTION

The present invention was made to solve the above problems in the conventional art.

Therefore it an object thereof to provide a method and an apparatus for power-source wiring design of semiconductor integrated circuits.

It is another object of the present invention to provide a method and an apparatus for power-source wiring design of semiconductor integrated circuits, which can estimate power consumption and the maximum amount of electric current of respective regions in a semiconductor substrate with high accuracy, and automatically obtain the most suitable power source.ground wiring in accordance with distribution of the electric amount on the semiconductor substrate.

Namely, a method for power-source wiring design of semiconductor integrated circuits according to the present invention includes the steps of setting an imaginary or theoretical lattice pattern on a semiconductor substrate, extracting electric characteristics of each of sectional regions of the semiconductor substrate divided by the lattices, obtaining circuit characteristics of each of the sectional regions on the basis of the extracted electric characteristics, displaying an operation result obtained by the circuit characteristics, and designing power-source wiring on the basis of the displayed operation result.

Moreover, an apparatus for power-source wiring design of semiconductor integrated circuits according to the present invention comprises lattice setting means for setting a theoretical or imaginary lattice pattern on a semiconductor substrate, electric characteristic extracting means for extracting electric characteristics of each of the sectional regions of the semiconductor substrate divided by the lattice set by the lattice setting means, circuit characteristic operation means for obtaining circuit characteristics of each of the sectional regions extracted by the electric characteristic extracting means, display means for displaying an operation result obtained by the circuit characteristic operation means, and power source design means for designing power-source wiring on the basis of the operation result displayed by the display means.

Moreover, an apparatus for power-source wiring design of semiconductor integrated circuits according to the present invention includes trial circuit generating means for generating a circuit model of power-source.-ground wiring of a semiconductor integrated circuit on trial, analysis means for analyzing electric characteristics of each sectional region of the circuit model generated by the trial circuit generating means, comparison means for comparing the analysis result of electric characteristics obtained by the analysis means to the circuit model with an analysis result of electric characteristics previously obtained by the analysis means to a circuit model previously obtained so as to estimate the former analysis result, and an improving plan generating means for generating information of a plan to improve the circuit model preferably in accordance with the result of comparison and estimation, and giving the information to the trial circuit generating means.

In the apparatus for power-source wiring design of semiconductor integrated circuits of this embodiment, the semiconductor substrate is divided into a plurality of sectional regions by the lattice setting means, and electric characteristics, such as the number of gates, demensions of transistors, load capacitance of gates, and clock frequencies related to gates of the sectional regions, of each of the sectional regions are extracted by the electric characteristic extracting means.

Then, circuit characteristics, such as a power-source electric potential, a power-source current, power consumption, and an amount of heat generation amount, of each of the sectional regions are obtained by the circuit characteristic operation means on the basis of the electric characteristics extracted by the electric characteristic extracting means, so as to obtain power consumption or an amount of current flowing therein.

Moreover, by the display means, the operation results on the respective sectional regions obtained by the circuit characteristic operation means are integrated for every row and every line on the semiconductor substrate, and displayed correspondingly to positions on the semiconductor substrate.

Then, the power-source wiring design means carries out power-source wiring design in accordance with the operation results displayed by the display means.

Also in the apparatus for power-source wiring design of semiconductor integrated circuits of the present invention, a circuit model of power-source.ground wiring of a semiconductor integrated circuit is generated on trial by the trial circuit generating means, and electric characteristics of each of the sectional regions in a circuit model generated by the trial circuit generating means are analyzed by the analysis means.

Then, an analysis result of electric characteristics obtained by the analysis means with respect to a circuit model generated by the trial circuit generating means the last time and another analysis result of electric characteristics obtained by the analysis means with respect to another circuit model generated this time is compared by the comparison means. Further, in accordance with the comparison result, the improving plan generating means generates information of a plan for improving the circuit model, and gives the information to the trial circuit generating means.

In such a manner, the most suitable design of the power-source wiring can be carried out by repetition of the procedure mentioned above.

These and other objects, features and advantages of the present invention will be more apparent from the following description of preferred embodiments, taken in conjunction with the accompanying drawings.

DETAILED DESCRIPTION OF THE EMBODIMENT

Figure 1:
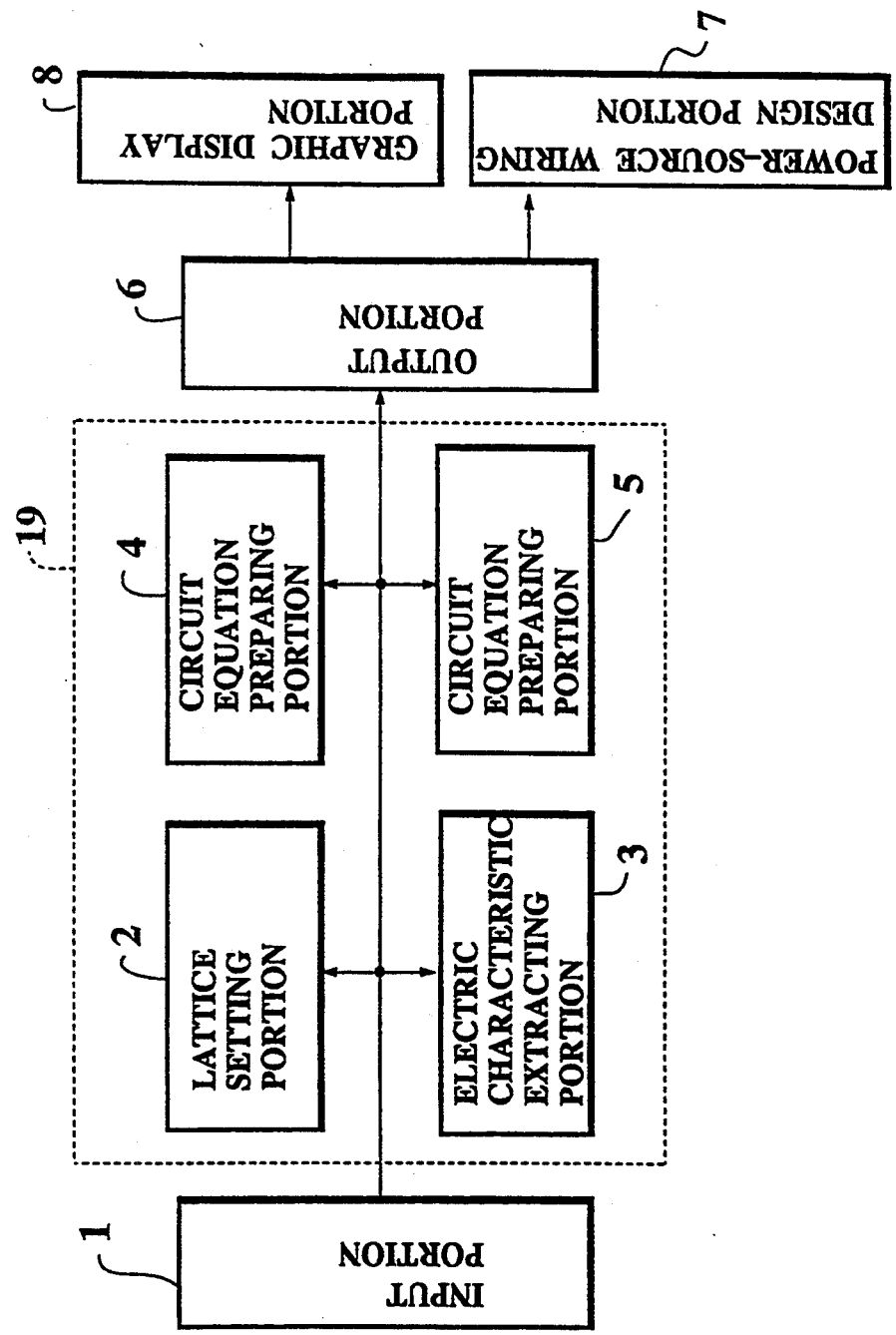
FIG. 1 is a block diagram of a first embodiment of an apparatus for power-source wiring design according to the present invention.

Generally, maldistribution of power consumption and electric currents on a chip can be expressed with ease by dividing a chip region of a semiconductor substrate into a plurality of sectional regions. To know power consumption and a current amount in each of the sectional regions, it is necessary to investigate parameters on electric characteristics, such as the number of gates, sizes of transistors, load capacities of respective lines and the like, included in the region.

In a CAD system for carrying out layout design, electronic circuit information stored in a data base can be retrieved with ease from a position of each element arranged. Accordingly, the parameters of electric characteristics can be known with ease by retrieving the electronic circuit information.

In CMOS circuit technology, since the power consumption is increased in proportion to the clock frequency, it is important to know clock frequencies respectively corresponding to gates included in each sectional region. However, the process can be easily carried out. Accordingly, power consumption and a current amount in each Sectional region can be calculated on the basis of the parameters of electric characteristics.

Moreover, it is very effective for the optimization of design of power-source.ground wiring that the obtained power consumption and current amount of each sectional region can be directly related to positions on a chip. In the case where power source lines and ground lines are wired vertically and parallel to form a lattice, as in gate-array.layout LSI, when it is possible to know power consumption and a current amount of a slit-like region defined between a side of one sectional region and an opposite side of the chip to the side of the sectional region, the relation between the slit-like region and the power-source lines becomes clear. Accordingly, it becomes easy to process the wiring correspondingly to the chip.

From the above reason, the present invention makes it possible to know power consumption, the maximum current amount and potential change of the power-source.ground of a vertical or a horizontal section defined between a side of each sectional region and the opposite side of the chip, by integrating respective factors related in regions existing in the section.

Moreover, according to the present invention, in the case where the electric power and current are supplied to respective sectional regions on a chip from power-source.ground lines in a specific wiring mode, a suitable circuit equation can be easily obtained by considering elements for expressing voltage-current characteristics of respective sectional regions and wiring resistance therein, so that the potential values and current densities of respective lines can be easily known. Accordingly, when an allowable current density and voltage drop are designated from the information, it becomes possible to decide how the number of power source lines and the width of wiring, that is, the wiring resistance be set. However, because of non-linearity of elements for expressing voltage-current characteristics of respective sectional regions and the like, the process requires repetition of such operations to improve the information obtained. Moreover, it is also necessary to provide an end-point judging process.

However, the relation between voltage and current supplied from the power source in the respective sectional regions is close to the characteristics of non-linear elements as a whole. A non-linearity is likely to cause much difficulty in solving an obtained circuit equation.

However, since the potential of each of sectional regions is not changed very much, a linear circuit equation can be established by replacing each value of current flowing in each sectional region obtained by repeated calculation of a potential thereof with an equivalent current source. Accordingly, it becomes possible to easily carry out the analysis of the distribution of voltage and current supplied from the power source design by the circuit equation.

On the basis of the allowable current density fixed in consideration of allowable voltage drop and electromigration, and the distribution of voltage and current obtained by the analysis, the wiring resistance of the circuit is changed, or new wiring channels are provided, so as to obtain desirable circuit characteristics. Moreover, in designing the circuit layout, the most suitable power-source wiring design is pursued by repeating such operation.

During the procedure, it is necessary to change the value of wiring resistance and provide new power-source wiring channels every operational repetition. Accordingly, to improve the electric characteristics most effectively, it is necessary to know where the wiring resistance be changed or new wiring channels be added; that is, where the electric potential or the current density is considerably different from a fixed value.

FIG. 1 is a block diagram showing a first embodiment of an apparatus for power-source wiring design of semiconductor integrated circuits of the present invention. As shown in the same drawing, the apparatus is provided with an input portion 1 for inputting necessary information, a lattice setting portion 2 for setting imaginary or hypothetical lattice on a chip which is an object to be designed, and dividing the surface of the chip into a plurality of sectional regions, and an electric characteristic extracting portion 3 for extracting electric characteristic parameters, such as the number of gates, dimensions of transistors, load capacities of the gates, and clock frequencies related to the gates, form each of the sectional regions. Moreover, the apparatus includes a circuit equation preparing portion 4 for preparing a circuit equation to obtain potential values of power-source lines, current values, power consumption, and an amount of heat generation, a circuit equation analysis portion 5 for solving the circuit equation, an output portion 6 for outputting an obtained operation result, a power-source wiring design portion 7 for designing power-source wiring on the basis of the operation result or an integration value obtained by calculation over all the vertical and horizontal lines provided on a chip, and a graphic display portion 8 for displaying the operation result on each of the respective sectional regions and the integration value correspondingly to positional coordinates on the chip.

The lattice setting portion 2, electric characteristic extracting portion 3, circuit equation preparing portion 4 and circuit equation analysis portion 5 compose an analysis portion 19.

Next, operation of the apparatus for power-source wiring design will be explained. Incidentally, the explanation on the apparatus includes explanation on an embodiment of a method for power-source wiring design of semiconductor integrated circuits of the present invention.

Figure 2:
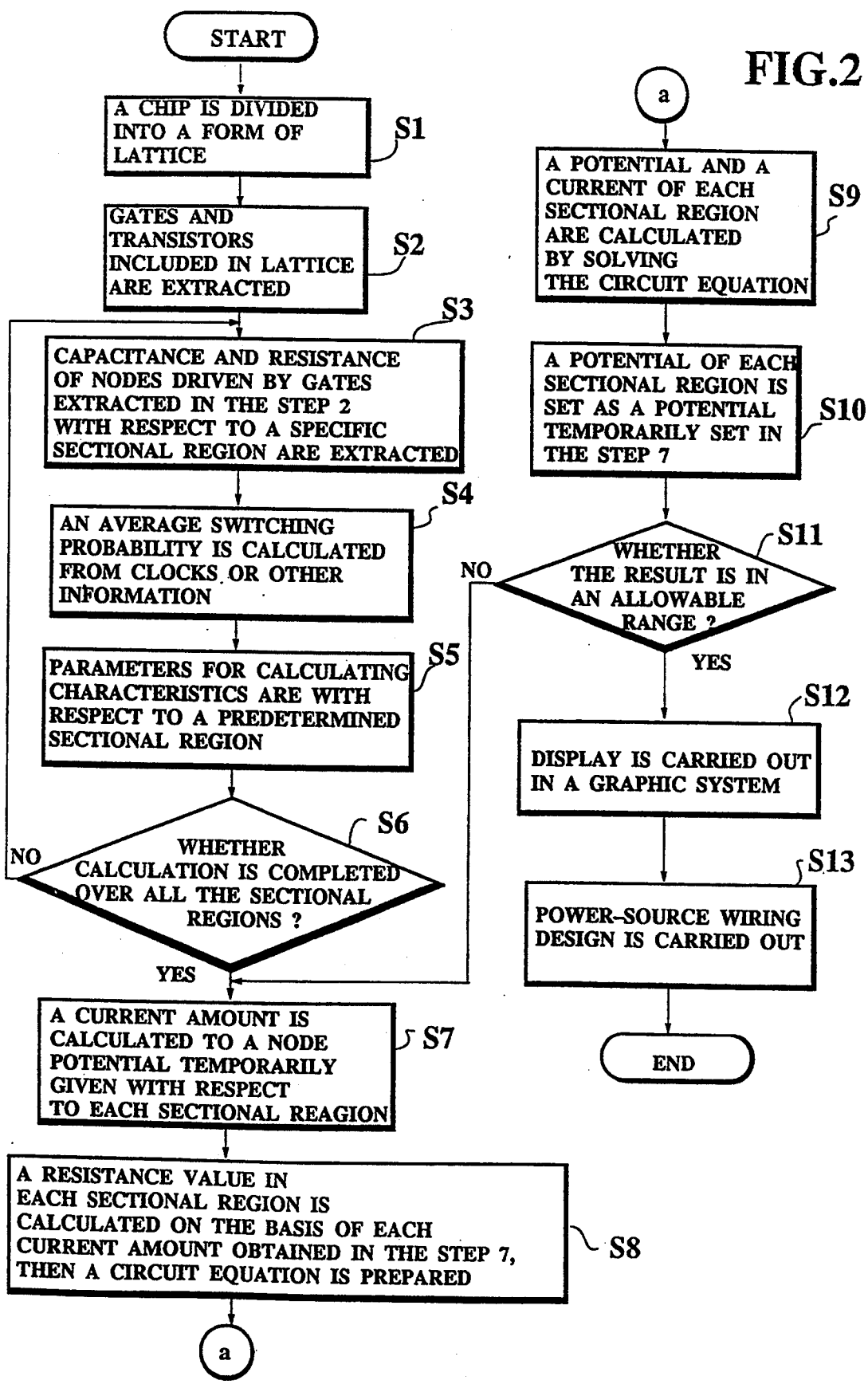
FIG. 2 is a flow chart to show operation of the first embodiment shown in FIG. 1.
Figure 3:
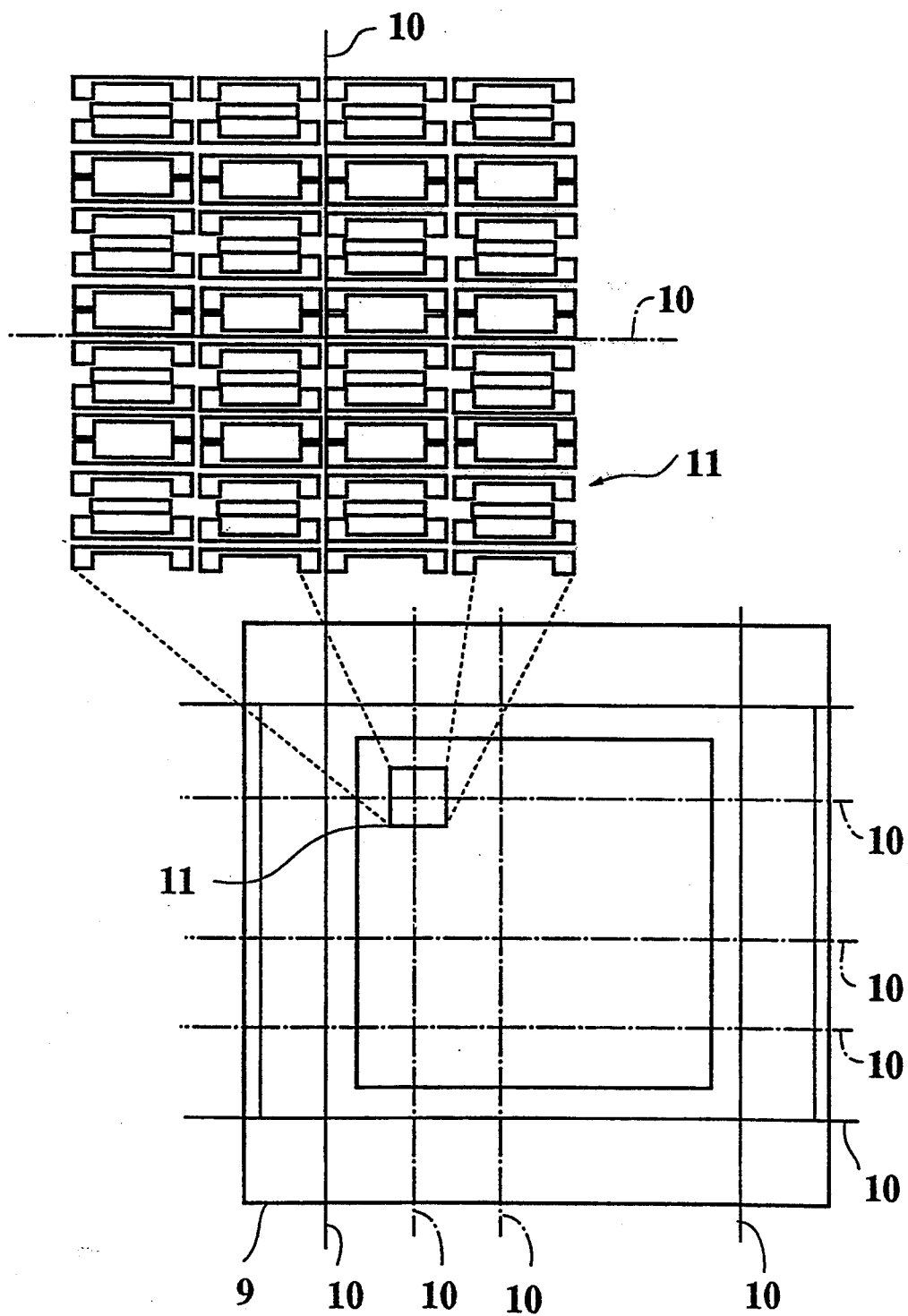
FIG. 3 is an explanatory diagram to show a method of dividing the surface of a chip into a plurality of regions in the first embodiment shown in FIG. 1.

FIG. 2 is a flow chart to show operation of the apparatus for power-source wiring design shown in FIG. 1, and FIG. 3 shows a semiconductor integrated circuit (a chip) 9 to be subjected to power-source wiring design.

First, in a step S1, necessary information is input from the input portion 1 to a portion for carrying out power-source wiring design, then an imaginary or theoretical lattice is set by vertical and horizontal dividing lines 10, 10 in an area of the chip to be designed, so as to form a plurality of sectional regions 11 by the lattice setting portion 2.

In the division of the chip area, it is desirable to set the sectional regions so that transistors included in the chip matrix are not cut by the dividing lines, and logic gates are included in as many of each of the sectional regions as possible. Moreover, it is also desirable to divide the chip area so that each of the sectional regions has a size such that each electric potential of power-source lines included in the region can be almost uniform.

Then, in a step S2, logic gates and transistors included in each of the sectional regions 11 divided by the dividing lines 10, 10 are extracted.

In this case, the extracted logic gates and transistors are classified for every sectional region. Such operation for extracting transistors included in each sectional region 11 can be easily carried out because the gate-array layout system have data on classified coordinates of the transistors in a data base thereof.

Next, in a step S3, load capacitance of the logic gates in each sectional region is calculated.

The amount of a current flowing in the logic gates greatly depends on the load capacitance. However, when the CMOS technology is used, floating capacitance and load capacitance of wiring should be considered. While, the extracted load capacitance is used a step of current calculation.

In a step S4, average switching probability is calculated. Namely, in case of the CMOS gate array, power consumption is in proportion to the switching probability. Thus, it is necessary to calculate the switching probability of logic gates included in a fixed sectional region in advance. Among methods related to the calculation, a method of utilizing a logic simulator gives the probability most directly. In the method, a fixed pattern to be tested is subjected to logic simulation so as to record the number of events generated by the simulation in all the gates included in the pattern. In such a manner, the number of events generated in a predetermined time in each of the gates can be known by continuing the simulation for a certain period. Then, an average number of events can be obtained by dividing the total sum of the number of all the events generated in gates included in a section to be tested by a time required for the test. As a result, the switching probability can be obtained.

On the other hand, it is also possible to calculate the average switching probability of logic gates included in such sectional regions from frequencies of clock signals of flip-flops supplying the logic gates with the signals.

Next, in a step S5, the data on gates are arranged over all the sectional regions and a table of parameters for current calculation is prepared for the following step of current calculation.

Then, the steps S3 to S5 are repeated till the calculation of average switching probability is completed over all the sectional regions 11. (step S6)

Incidentally, the steps S2 to S6 are executed by the characteristic extracting portion 3.

In the following steps S7 to S11, an amount of current flowing in each of the sectional regions 11 is calculated, and a circuit equation (node equation) is prepared with respect to an electric potential and a current amount of each of the power-source lines, then the analysis process is carried out. Incidentally, repetition of the analysis process in the step S11 is shown in the FIG. 2, this means that the process is repeated till the voltage-current characteristics can be correctly obtained.

The above processes are carried out by the circuit equation preparing portion 4 and the circuit equation analysis portion 5.

In order to calculate power consumption of each sectional region 11 in the step S7, it is necessary to use intrinsic properties of the device technology for constructing integrated circuits. Namely, according to Neil H. E. Weste et al., "Principles of CMOS VLSI Design:

A Systems Perspective" AT&T Bell Laboratories Inc. 1985, the power consumption ($P_a$) for switching gates in the CMOS technology is expressed as follows:

$$P_a = C_L \cdot V_{DD}^2 \cdot f_P \quad (1)$$

where CL is load capacitance, $V_{DD}$ is voltage of the power-source and fP is a repetitive frequency of an input square wave. Incidentally, since these parameters are already calculated in the step S3 or S4, the power consumption of each sectional gate can be easily calculated. Then, the power consumption and current amount over all the sectional regions 11 can be also calculated by figuring out the total sum of the power consumption of each sectional region.

The $V_{DD}$ is decided as follows. Namely, a power-source voltage value of a VLSI to be used is temporarily given in the first repetition. Since power-source voltage applied to a chip is close to internal power-source potential generated by voltage drop in the chip, it is advantageous for efficiency of calculation to utilize the power-source potential applied to the chip as an initial value.

Incidentally, in the following calculation, a potential level including voltage drop of the power-source lines known from the previous calculation is temporarily given.

Figure 4:
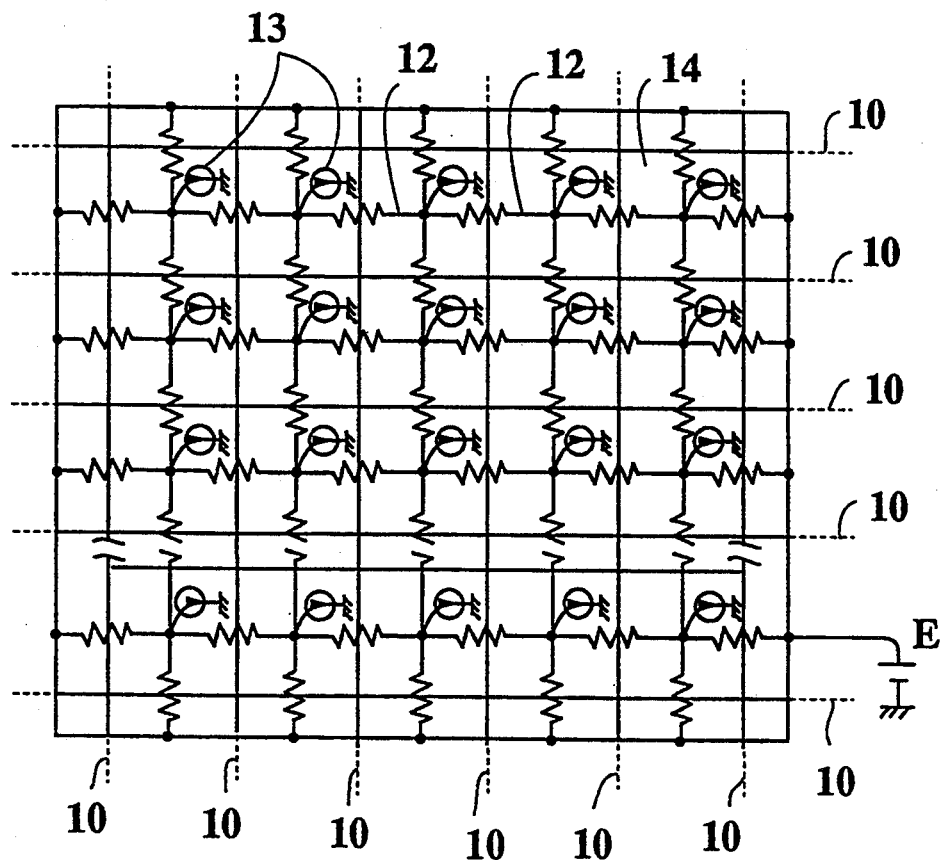
FIG. 4 is a diagram to show equivalent circuits on a chip for power-source wiring design in the first embodiment shown in FIG. 1.

In the following step S8, a circuit equation is prepared. Namely, as shown in an equivalent circuit in FIG. 4, a resistance value of power source lines 12 respectively running along the four sides of one of the sectional regions 11 is decided by calculation based on the width and resistivity of the lines. In this case, the power source lines 12 are so provided as to cover the chip 9 like a grid, however, the mode of the lines 12 is not always limited thereto. For simplification, the wiring on the ground side is not shown here, but it has similar circuit construction. Moreover, as a value of each current source 13, the current value obtained in the step S7 is used.

Figure 5:
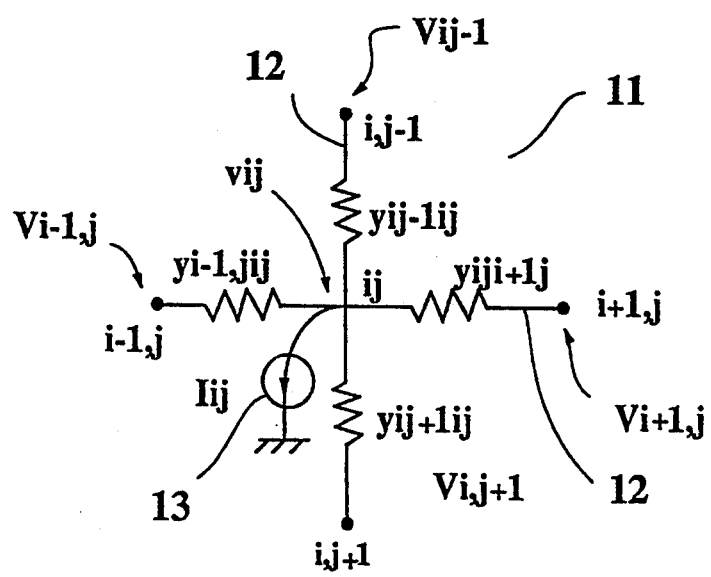
FIG. 5 is an enlarged diagram of an equivalent circuit in one sectional region of the first embodiment in FIG. 1.

FIG. 5 shows a portion corresponding to the sectional region surrounded by the power source lines 12. In the same drawing, (i, j) means co-ordinates to the respective sectional regions 11 shown in FIG. 4. These i and j satisfy $1 \leq i \leq N$, $1 \leq j \leq M$ respectively, where N, M are the numbers of times of division in the vertical and horizontal directions respectively. Moreover, when Iij is a current flowing in each sectional region 11, similarly the corresponding potential is expressed by Vij, and admittance values corresponding to resistance of the four sides of each sectional region are expressed as $y_{i-1,j,i,j}$, $y_{i,j-1,i,j}$, $y_{i+1,i,j}$, $y_{i,j+1,i,j}$, a circuit equation or a node equation is obtained as follows:

$$YV = I \quad (2)$$

where V is a vector of a node potential $V_{ij}$, and I is a vector of a current $I_{ij}$ flowing a corresponding branch, moreover Y means an admittance matrix composed of the respective admittance values.

In a step S9, the circuit equation (2) is solved. The equation (2) can be changed into an equation (3) as follows:

$$\begin{vmatrix} Y_{11} & Y_{12} \\ Y_{21} & Y_{22} \end{vmatrix} \begin{vmatrix} V_1 \\ V_2 \end{vmatrix} = \begin{vmatrix} I_1 \\ I_2 \end{vmatrix} \quad (3)$$

In the equation (3), $V_1$ is a potential vector corresponding to a potential level of a node in a peripheral portion of a circuit, and is the same as a power-source potential E when resistance does not exist in the peripheral portion. While, a current vector $I_1$ corresponds to a current which flows to the ground from the mode of the peripheral portion, but is 0 in this case. $V_2$ is a potential vector of a node outside the peripheral portion, and has a lower value than E because of voltage drop by resistance. $I_2$ has a value of the current which temporarily given in the step S7 and flows from respective nodes to the ground, further is shown as the current sources 13 in FIG. 4.

When the equation (3) is solved with respect to $V_2$, the following result is obtained.

$$V_2 = Y_{22}^{-1} I_2 - Y_{22}^{-1} Y_{21} V_1 \quad (4)$$

When the potential $V_1$ of the power source and the current $I_2$ flowing from the respective sectional regions 11 to the ground are given to the equation (4), the potential $V_2$ of each node can be calculated. A current $I_{o,o,i,j}$ flowing from the peripheral portion into the circuit through the power source lines 12 (where $1 \leq i \leq N$, and j=1 or M, or i=1 or N, and $1 \leq j \leq M$) is expressed as follows:

$$I_{o,o,i,j} = Y_{o,o,i,j}(V_{o,o} - V_{i,j}) \quad (5)$$

Next, in a step S10, the potential value $V_2$ calculated in the step S9 is substituted for the node potential value temporarily given in the step S7 for calculating currents flowing the respective sectional regions 11.

In a step S11, it is determined whether the repetition of calculation should be stopped. The repetition is stopped on condition that a sum of squares of a difference between the potential value $V_1$ calculated this time and that calculated at the previous time becomes lower than a fixed value.

In a step S12, the result is displayed on the graphic display portion 8. Since each current flowing from the power source to the equivalent circuit shown in FIG. 4 can be known for every peripheral region 14 by the equation (5), the current value is displayed at peripheral portions to the chip 9 as shown in FIG. 6.

In the following step S13, power-source wiring is designed on the basis of the operation result obtained by the steps S9, S10 or the integration value over all the vertical and horizontal lines on the chip 9.

Figure 6:
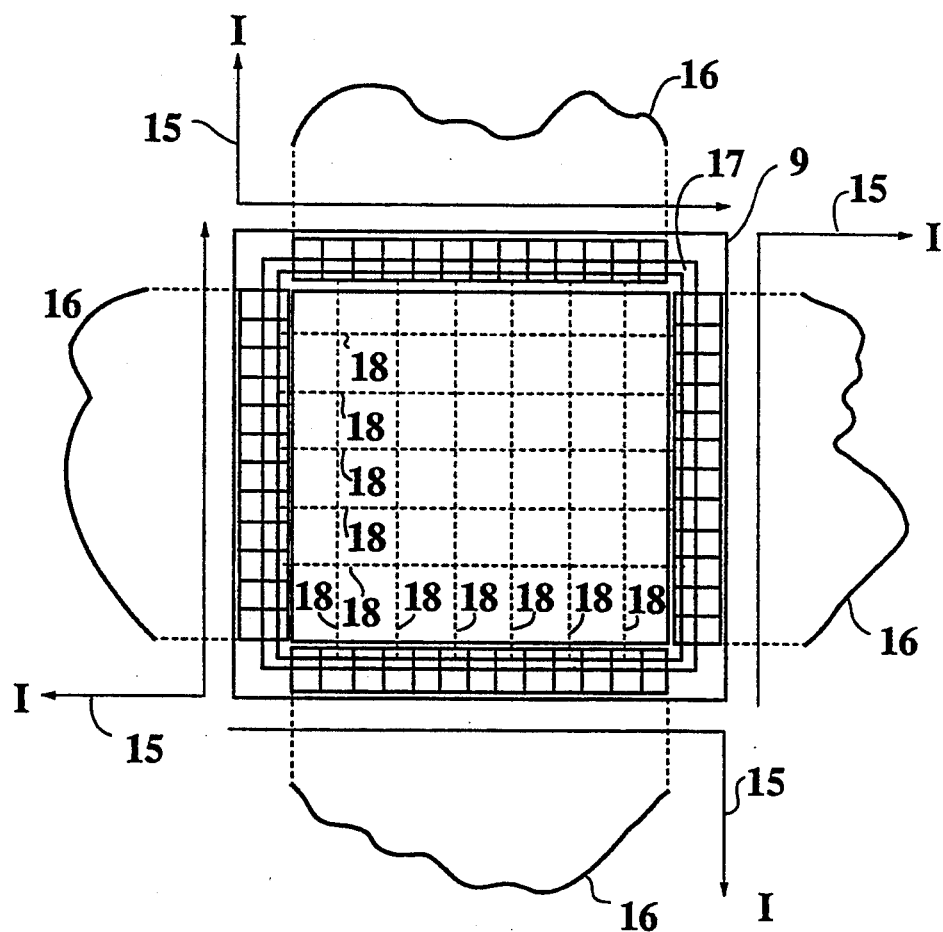
FIG. 6 is an explanatory diagram to show an example of display of a graph for showing currents respectively flowing in vertical and horizontal rows of the respective sectional regions on a chip.
Figure 7:
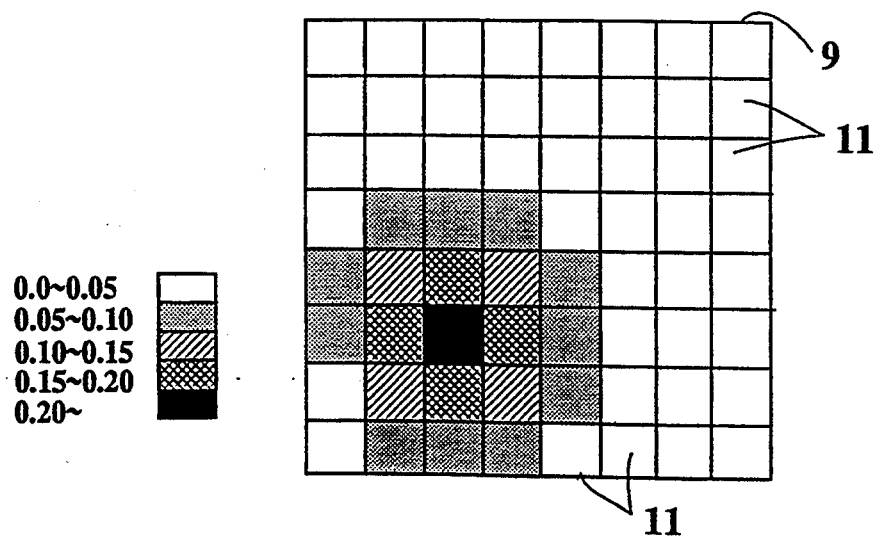
FIG. 7 is an explanatory diagram to show degrees of potential reduction over a chip by colors.

In FIG. 6, reference numeral 15 shows axes of a graph provided along the four sides of a schematic diagram of the chip 9, and 16 designates curved lines graphically expressed as the current value I calculated by the equation (5). In the schematic diagram of the chip 9, only wiring on the power-source side is displayed for simplification. As shown in the same diagram, a power-source line 17 is provided over input-output cells in a ring form, from which power-source lines 18 are provided so that currents are supplied to the interior of the chip 9.

The display mode is not limited to that shown above; it is possible to use a display mode in which is displayed a difference between each allowable current amount of power-source lines decided from the electromigration and the like and each corresponding current amount obtained by calculation.

Moreover, as still another display mode, there is a method in which voltage drop in the interior of the chip 9 is shown every sectional region 11. According to the mode, it is also possible to designate the voltage drop corresponding to each sectional region 11 by colors. Incidentally, the voltage drop to each sectional region 11 can be easily obtained by the equation (4).

As operation results dealt with in the process system, power consumption and heat generation can be mentioned, as well as the potential values of power-source lines and the current amounts.

In such a manner, in this embodiment, the chip area is divided by the imaginary lattice into a plurality of sectional regions, so as to obtain various parameters concerning electric characteristics of the respective sectional regions. Then circuit equations with respect to the voltage-current characteristics and the power-source potential between the power source lines and the ground lines in the respective regions are established, so as to enable the display of currents flowing from the four sides of the chip to the interior thereof. Accordingly, the positions where the width of power source lines must be enlarged can be recognized.

When the method for power-source design wiring as mentioned above is suitably combined with a floor plan for deciding a rough arrangement of cells, each of which is composed of a plurality of elements in the chip, it becomes possible to suppress local heat generation and unify the generation of heat in the chip 9.

In a circuit with a relatively large power consumption, for example, in an ECL, it is necessary to avoid local heat generation in the chip 9 caused by the large power consumption. However, according to the present invention, since it is possible to display the power consumption of the respective sectional regions on the chip 9 or the distribution of heat generation obtained by the equations at the graphic display portion 8, the power consumption or the distribution of heat generation can be unified over all the chip 9 by changing the arrangement of cells with reference to the display.

Moreover, by suitably combining the method for power-source wiring design with an automatic floor plan operation apparatus for automatically deciding the rough arrangement of cells by using a computer, the heat generation in the chip 9 can be similarly unified.

Namely, by repeating the operating step for obtaining the power consumption and the step for unifying it by arranging positions of respective cells in accordance with information on the distribution of heat generation obtained by the operation result from the former step until the power consumption is in a predetermined allowable range, it becomes possible to unify the heat generation.

Next, a second embodiment relating to a method and an apparatus for power-source wiring design of semiconductor integrated circuits according to the present invention will be explained with reference to FIGS. 8 to 19.

In the second embodiment, a circuit model of power-source.ground wiring of a semiconductor integrated circuit is generated on trial, then electric characteristics of each sectional region in the circuit model are analyzed by an analysis portion similar to that described in the first embodiment. Thereafter, the analysis result of electric characteristics obtained by the analysis portion is compared with an analysis result of electric characteristics similarly obtained by the analysis portion at the previous time. Then information of a plan for improving the circuit model desirably is generated in accordance with the comparison result and given to the following trial circuit generation. Thereafter, the trial procedure is repeated so as to optimize the power-source.ground wiring design.

Figure 8:
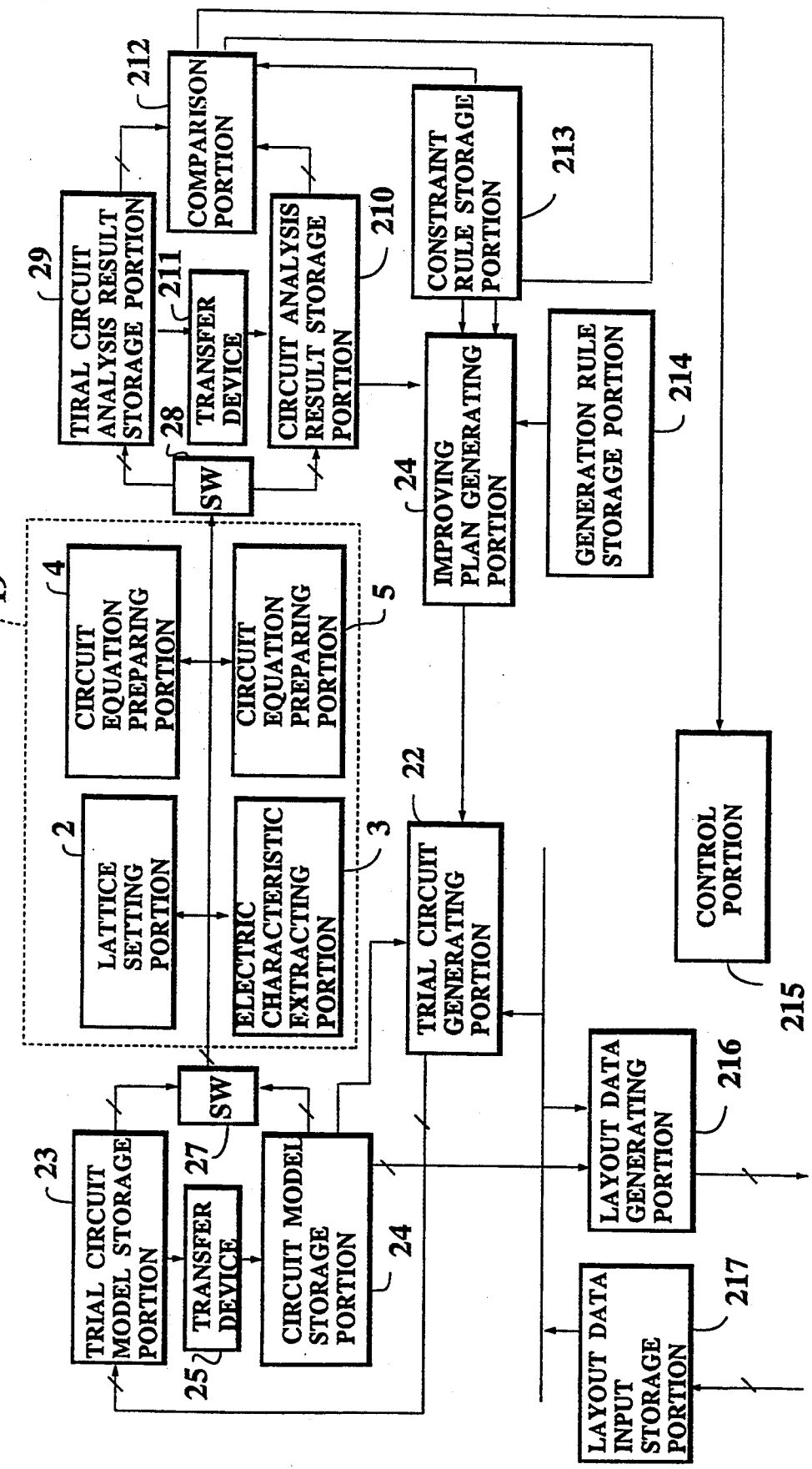
FIG. 8 is a block diagram of a second embodiment of an apparatus for power-source wiring design according to the present invention.

FIG. 8 shows a block diagram of an apparatus for power-source wiring design of the second embodiment. As shown in the same drawing, the apparatus comprises an improving plan generating portion 24 for generating an information of a plan for improving the power-source wiring in accordance with a predetermined rule of generating the information, a trial circuit generating portion 22 for preparing a circuit model in accordance with the information of improving plan, inputted layout data, and a circuit model prepared at the previous time, a trial circuit model storage portion 23 for storing the generated circuit model, a circuit model storage portion 24 for storing circuit models initially or previously prepared, and a transfer device 25 for controlling transfer of data between the trial circuit model storage portion 23 and the circuit model storage portion 24.

Moreover, the apparatus includes an analysis portion similarly constructed as in the first embodiment for obtaining values of voltage and currents by analyzing a given circuit, a switch 27 for switching analysis modes on data of a trial circuit and data of stored circuit models, a switch 28 for switching regions for storing the analysis results, a trial circuit analysis result storing portion 29 for storing the trial circuit analysis result, a circuit analysis result storing portion 210 for storing the analysis result of the initial and the previous circuit, a transfer device 211 for transferring data between both the storage portions 29, 211, a comparison portion 212 for estimating the degree of improvement between a circuit given the improving plan and the previous circuit, a rule storage portion 213 for storing a rule under conditions for the comparison, and a rule storage portion 214 for storing a rule required for generating the improving plan.

Furthermore, the apparatus includes a control portion 215 for controlling a procedure of processes over all the apparatus and a flow of data, a layout data generating portion 216 for converting results obtained from the procedure into a form of layout data, and a layout data input storage portion 17 for inputting necessary information.

Next, operation of the apparatus for power-source wiring design of semiconductor integrated circuits of the second embodiment is described.

Figure 9:
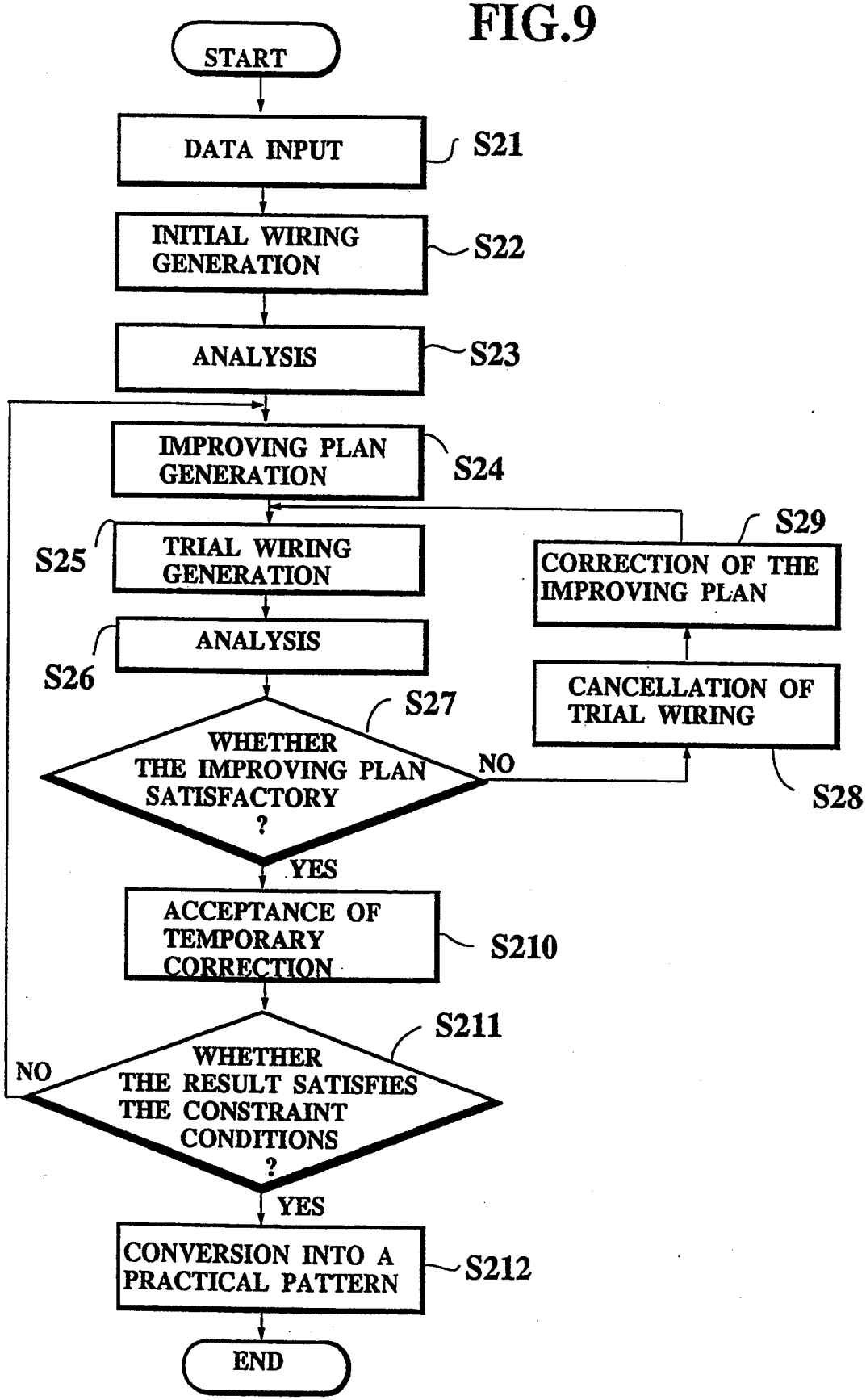
FIG. 9 is a flow chart to show operation of the second embodiment shown in FIG. 8.

FIG. 9 is a flow chart to show operation of the apparatus for power-source wiring design of semiconductor circuits of the second embodiment.

As shown in the drawing, in a step S21, necessary information is inputted to power-source wiring design from the layout data input portion 217, then the information is converted into data having suitable structure to the following processes.

Figure 10:
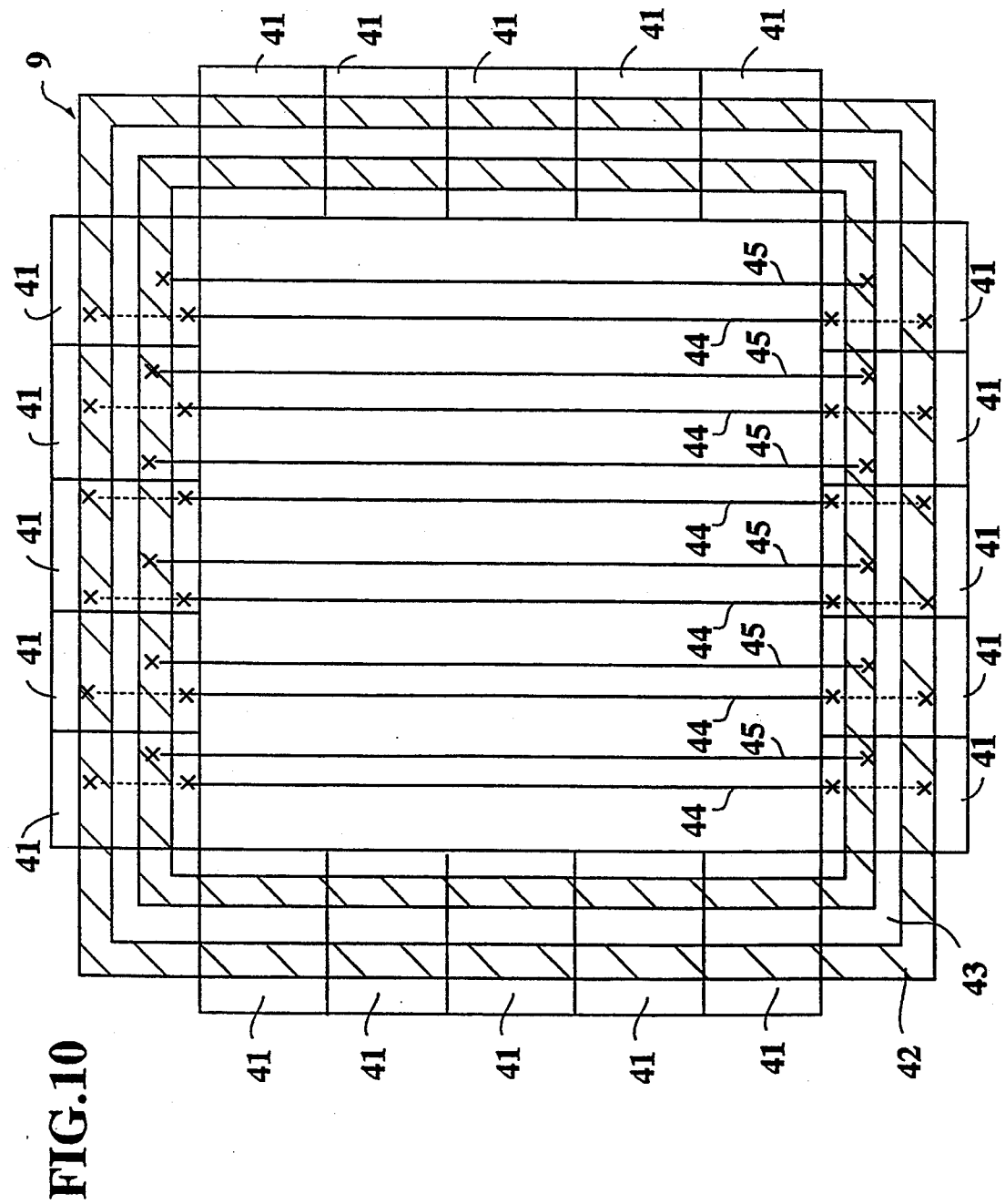
FIG. 10 is an explanatory diagram to show an example of an arrangement patter of power-source-ground lines on a chip used in the second embodiment shown in FIG. 8.

Next, in a step S22, an initial wiring pattern is produced. In the production of initial wiring, a wiring pattern is produced in accordance with a rule decided by a form of a chip stored in the rule storage portion 214 shown in FIG. 8. FIG. 10 shows an example of the initial wiring pattern, in which input-out pads 41 are arranged at peripheral portions of the chip 9. On the pads 41, a bold power source line 42 and a ground line 43 run regularly. Further, fine power source lines 44 and ground lines 45 are arranged on respective power source terminals of cells so that the power source can be supplied to the respective cells. In such construction, a procedure of generating the initial wiring is stored in the rule storage portion 214 so as to generate an initial wiring pattern based on indication to the improving plan generating portion 24 for generating the initial wiring in accordance with a matrix to be processed.

The generated initial circuit is converted by the trial circuit generating portion 22 into a circuit analysis model which can be easily dealt with, and stored in the trial model storage portion 23.

Figure 11:
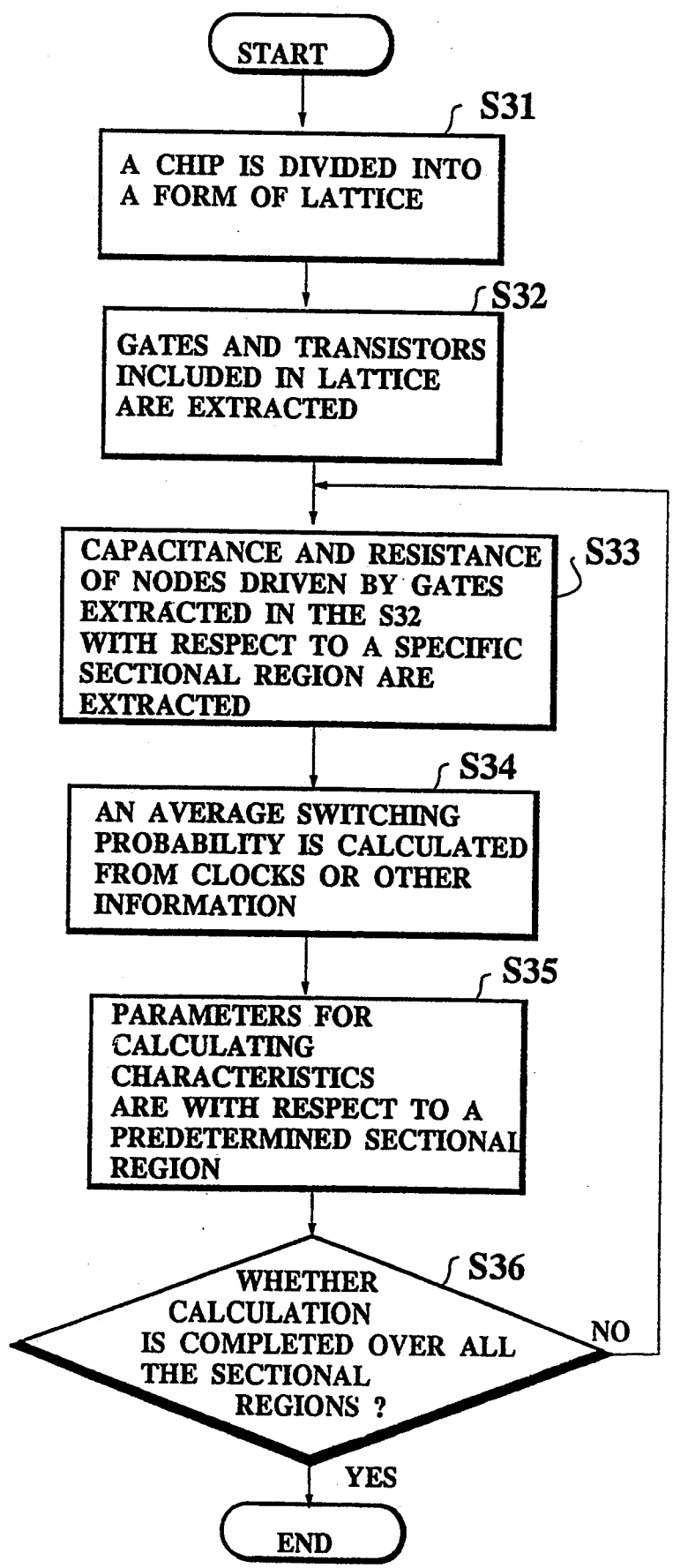
FIG. 11 is a flow chart to show a process for analyzing electric characteristics of each imaginary or theoretical lattice provided on a chip in the second embodiment shown in FIG. 8.

A flow of the generation procedure of the initial wiring model is shown in FIG. 11 in detail.

First, an area of a chip 9 to be processed is divided into a plurality of sectional regions 11 by lattice defined by imaginary or hypothetical vertical and horizontal lines 10, 10 (Step S31).

In this case, it is preferred that the division be carried out so that transistors included in the chip matrix 9 are not cut by the imaginary lines 10, 10, and logic gates are included in as many of each of the sectional regions 11 as possible. Moreover, it is also preferred that the size of each sectional region 11 be so set that the potential level of power source lines included in the region is almost uniform.

Next, logic gates and transistors included in each sectional region 11 are extracted (Step S32). The extracted logic gates and transistors are classified for every sectional region 11. The operation of extracting the transistors included in each sectional region 11 is relatively easy because such a gate array layout system contains such transistors in a classified form by coordinates in a data base thereof.

Next, in a step S33, load capacitance of the respective logic gates in each sectional region 11 is calculated.

The current flowing in the logic gates greatly depends on the size of the load. However, when CMOS technology is utilized, the floating capacitance and the load capacitance of wiring should be considered. Incidentally, the extracted size of the load is utilized in a step for current calculation.

In a step S34 average switching probability is calculated. Namely, in case of the CMOS gate array, power consumption is in proportion to the switching probability. Thus, it is necessary to calculate the switching probability of logic gates included in a fixed sectional region in advance. Among methods related to the calculation, a method of utilizing a logic simulator gives the probability most directly. In the method, a fixed pattern to be tested is subjected to logic simulation so as to record the number of events generated by the simulation in all the gates included in the pattern. In such a manner, the number of events generated in a predetermined time in each of the gates can be known by continuing the simulation for a certain period. Then, an average number of events can be obtained by dividing the total sum of the number of all the events generated in gates included in a section to be processed by a time required for the test. As the result, the switching probability can be obtained.

On the other hand, it is also possible to calculate the average switching probability of logic gates included in such sectional regions from frequencies of clock signals of flip-flops supplying the logic gates with the signals.

Next, in a step S35, the data on gates are arranged over all the sectional regions and a table of parameters for current calculation is prepared for the following step of current calculation.

Then, the steps S33 to S35 are repeated till the calculation of average switching probability is completed over all the sectional regions 11. (Step S36)

Incidentally, the steps S32 to S36 are executed by the improving plan generating portion 24.

The generated initial circuit is converted into a circuit analysis model by the trial circuit generating portion 22, and stored in the trial model storage portion 23. Thereafter, electric characteristics of the initial wiring are analyzed by the analysis portion 19.

Figure 12:
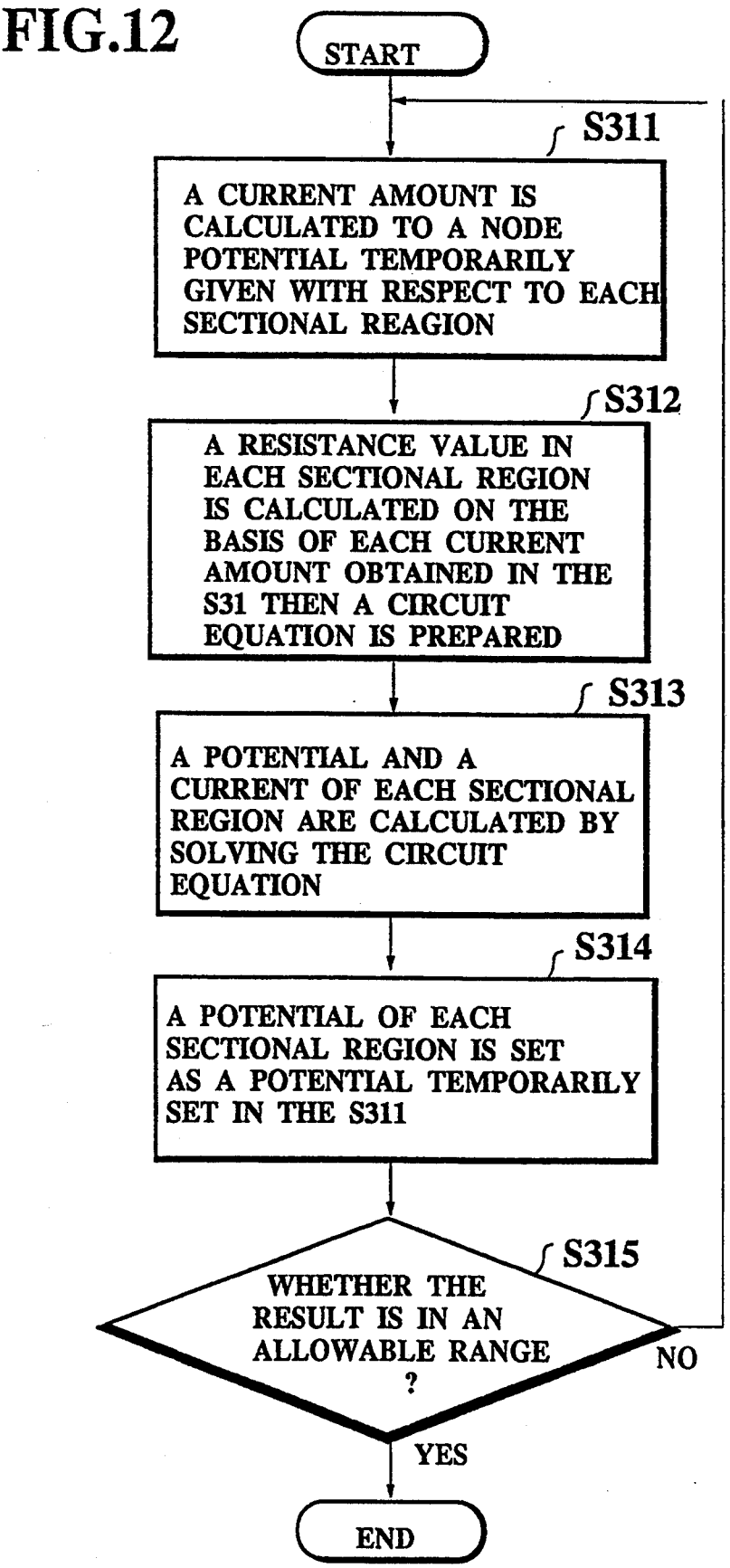
FIG. 12 is a flow chart to show a process for obtaining circuit characteristics of each imaginary or theoretical lattice in the second embodiment showing in FIG. 8.

A procedure of the analysis of the electric characteristics by the analysis portion 19 is shown in FIG. 12 in detail.

In the following steps S311 to S314, an amount of current flowing in each of the sectional regions 11 is calculated, and a circuit equation (node equation) is prepared with respect to an electric potential and a current amount of each of the power-source lines, then the analysis process is carried out. Incidentally, as shown in FIG. 12, the procedure is once ended at a step S315, and the analysis is repeated thereafter, this means that the process is repeated till the voltage-current characteristics can be correctly obtained.

First, power consumption is calculated with respect to each sectional region 11 in the step 311.

In order to calculate the power consumption, it is necessary to use intrinsic properties of the device technology for constructing integrated circuits. Namely, according to Nell H. E. Weste et al., "Principles of CMOS VLSI Design: A Systems Perspective" AT&T Bell Laboratories Inc.1985, the power consumption ($P_a$) for switching gates in the CMOS technology is expressed as follows:

$$P_a = C_L \cdot V_{dd}^2 \cdot f_P \qquad (1)$$

where $C_L$ is load capacitance, $V_{DD}$ is voltage of the power-source and $f_P$ is a repetitive frequency of an input square wave. Incidentally, since these parameters are already calculated in the step S33 or S34, the power consumption of each sectional gate can be easily calculated. Then, the power consumption and current amount over all the sectional regions 11 can be also calculated by figuring out the total sum of the power consumption of each sectional region.

The $V_{DD}$ is decided as follows. Namely, a power-source voltage value of a VLSI to be used is temporarily given in the first repetition. Since power-source voltage applied to a chip is close to internal power-source potential generated by voltage drop in the chip, it is advantageous for efficiency of calculation to utilize the power-source potential applied to the chip as an initial value.

Incidentally, in the following calculation, a potential level including voyage drop of the power-source lines known from the previous calculation is temporarily given.

In the following step S312, a circuit equation is prepared. Namely, as shown in an equivalent circuit in FIG. 4, a resistance value of power source lines 12 respectively running along the four sides of one of the sectional regions 11 is decided by calculation based on the width and resistivity of the lines. In this case, the power source lines 12 are so provided as to cover the chip 9 like a grid, however, the mode of the lines 12 is not always limited thereto. For simplification, the wiring on the ground side is not shown here, but it has similar circuit construction. Moreover, as a value of each current source 13, the current value obtained in the step S311 is used.

FIG. 5 shows a portion corresponding to the sectional region surrounded by the power source lines 12. In the same drawing, (i, j) means co-ordinates to the respective sectional regions 11 shown in FIG. 4. These i and j satisfy $1 \leq i \leq N$, $1 \leq J \leq M$ respectively, where N, M are the numbers of times of division in the vertical and horizontal directions. Moreover, when Iij is a current flowing in each sectional region 11, similarly the corresponding potential is expressed by $V_{ij}$, and admittance values to resistance of the four sides of each sectional region are expressed as $y_{i-1,j,\,i,j}$, $y_{i,j-1,\,i,j}$, $y_{i+1,\,i,j}$, $y_{i,j+1,\,i,j}$, a circuit equation or a node equation is obtained as follows:

$$YV = I \qquad (2)$$

where V is a vector of a node potential $V_{ij}$, and I is a vector of a current $I_{ij}$ flowing in a corresponding branch; Y means an admittance matrix composed of the respective admittance values.

In a step S313, the circuit equation (2) is solved. The equation (2) can be changed into an equation (3) as follows:

$$\left| \begin{array}{cc} Y_{11} & Y_{12} \\ Y_{21} & Y_{22} \end{array} \right| \left| \begin{array}{c} V_1 \\ V_2 \end{array} \right| = \left| \begin{array}{c} I_1 \\ I_2 \end{array} \right| \qquad (3)$$

In the equation (3), $V_1$ is a potential vector corresponding to a potential level of a node in a peripheral portion of a circuit, and is the same as a power-source potential E when resistance not exist in the peripheral portion. While, a current vector $I_1$ corresponds to a current which flows to the ground from the node of the peripheral portion, but is 0 in this case. $V_2$ is a potential vector of a node outside of the peripheral portion, and has a lower value than E because of voltage drop by resistance. $I_2$ has a value of the current which temporarily is given in the step S311 and flows from respective nodes to the ground, and further is shown as the current sources 13 in FIG. 4.

When the equation (3) is solved with respect to V2, the following result is obtained.

$$V_2 = Y_{22}^{-1} I_2 - Y_{22}^{-1} Y_{21} V_1 \qquad (4)$$

When the potential $V_1$ of the power source and the current I2 flowing from the respective sectional regions 11 to the ground are given to the equation (4), the potential $V_2$ of each node can be calculated. While, a current $I_{o,o,i,j}$ flowing from the peripheral portion into the circuit through the power source lines 12 (where $1 \leq i \leq N$, and $j=i$ or M, or $i=1$ or N, and $1 \leq j \leq M$) is expressed as follows:

$$I_{o,o,i,j} = Y_{o,o,i,j}(V_{o,o} - V_{i,j}) \qquad (5)$$

Next, in a step S314, the potential value V2 calculated in the step S313 is substituted for the node potential value temporarily given in the step S311 for calculating currents flowing in the respective sectional regions 11.

In a step S315, it is judged whether the repetition of calculation should be stopped. Namely, the repetition is stopped on condition that a sum of squares of a difference between the potential value $V_1$ calculated this time and that calculated at the previous time becomes lower than a fixed value.

Next, in a step S24, the improving plan generating portion 21 decides how the power source lines should be compensated, in accordance with data retrieved from the circuit analysis result storage portion 211 in which the analysis result from the analysis portion 19 in FIG. 8 is stored, the conditions stored in the condition rule storage portion 213, and the improving plan generating rule stored in the rule storage portion 214.

The optimization is carried out in the following manner in the step S24.

As a first constraint condition, the current density of a current i flowing in all the power-source.ground wiring is fixed at Imax in consideration of the electromigration concerning metal wiring.

Namely, with respect to (i. j) respectively satisfying $1 \leq i \leq M$, $1 \leq j \leq N$, the following conditions are determined:

$$i_{i-1,j,\,i,j} < W_{i-1,j,\,i,j} * \text{Imax, and}$$

$$i_{i,j-1,\,i,j} < W_{i,j-1,\,i,j} * \text{Imax,}$$

where $W_{i-1,j,\,i,j}$, $W_{i,j-1,\,i,j}$ are widths of the power-source lines and the like.

As a second constraint condition, the voltage drop generated by resistance of the power-source.ground wiring is fixed.

Namely, with respect to (i. j) respectively satisfying $1 \leq i \leq M$, $1 \leq j \leq N$, the following conditions are determined:

$$V - v_{i,j} \leq \Delta V \text{max, and}$$

$$0 - v_{i,j} \leq \Delta V \text{max,}$$

where V is the power-source voltage, $\Delta V$ is allowable potential change, and $V_{i,j}$ is a potential at each node in the lattice.

Next, a function for the optimization is determined so as to minimize the total sum of widths of all the power-source lines and the number of vias to assure the wiring resource utilizable for general wiring.

Namely the function is so decided as to minimize the following formula:

$$\alpha * \Sigma w * 1 + (\text{The number of vias concerning the power source}),$$

where $\alpha$ is a parameter for adjusting weights of two estimation functions, and $\Sigma w * 1$ is the total area of wiring used for the power source.

Then such optimization is carried out in the following procedure.

First, as shown in FIG. 10, the circuit model of power-source.ground wiring is composed of bold wiring 42, 43 provided on the input-output cells 41 at peripheral portions of the chip 9, and wiring 44, 45 so provided as to supply power source to respective cells of a core portion in the chip 9. Then, as shown in FIG. 23, the model is completed by providing power-source compensation wiring 46, 47 vertically to the wiring 44, 45 in accordance with positional distribution of power consumption in the chip 9, further adding vias 48, 49 to nodes of these wiring, so as to assure the power-source compensation. Accordingly, for the optimization of this case, it is necessary to consider how the amount of power source lines and the number of vias be reduced while keeping these constraint conditions.

Figure 14:
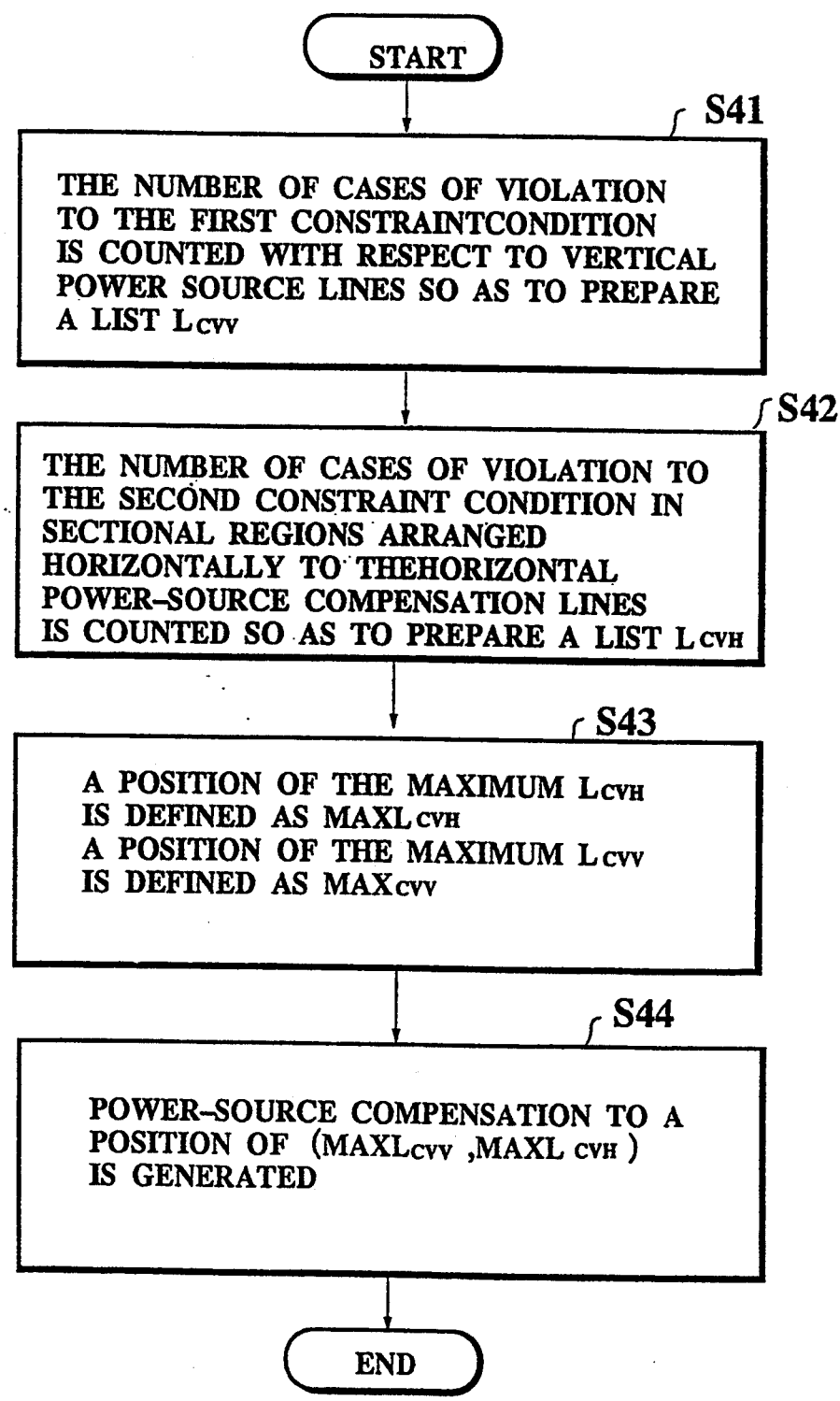
FIG. 14 is a flow chart of an improving plan generating process of a circuit model in the second embodiment shown in FIG. 8.

To answer the necessity, in this embodiment, the power-source compensation lines are provided in regions where the number of cases that these constraint conditions are not satisfied is relatively large. This procedure is shown in FIG. 14 in detail.

First, with respect to the first constraint condition determined in consideration of the electromigration, the number of regions where currents flow in an amount exceeding a predetermined value is counted, so as to prepare a list LCVV in which the number of the violations is recorded over all the respective power source lines. Namely, in a power source line having a relatively large number of violations, a current of an excessive amount for the line width flows (Step S41).

Subsequently, with respect to the second constraint condition given to the sectional regions imaginarily provided horizontally to the power-source compensation lines, the number of regions where change of the power-source potential exceeds a predetermined range is counted, so as to prepare a list LCVH in which the counted number is recorded over all the horizontal sectional regions (Step S42).

Thereafter, positions to be compensated are investigated. Namely, a line having the maximum LCVH and the maximum Lcvv is pursued (Step S43). In this embodiment, since the power compensation is given to the horizontal wiring, the integration of power compensation in the horizontal direction should be required. Each of the vias for supplying a current from the horizontal wiring for power-source compensation to the vertical power-source wiring should be supplied to a point where LCVV is the maximum.

Then, a plan for compensation is prepared based on the positions searched in the step S43 (Step S44). First, whether the power-source lines already provided can be used for the purpose is investigated. Namely, if there are power-source compensation lines close to the position of the maximum $L_{CVH}$, effectiveness of these lines is considered. This means the possible effective use of the wiring resource. When there are no effective power-source compensation lines, a plan to provide compensation lines anew is made. Thereafter, a plan to deal with a position of the max $L_{CVV}$ as a point of via generation is taken.

In such a manner, when the power-source compensation procedure is completed, a trial model is prepared by utilizing the trial circuit generating portion 22 in FIG. 8 in a step S25 of the flow chart in FIG. 9. However, since it is necessary that models previously made be stored for reference, if necessary, these are evacuated into the circuit model storage portion 24 though the transfer device 25. The procedure for producing the trial circuit model is the same as that in the step S22. However, since the average switching probability is not changed, and the circuit construction is changed a little by the power-source compensation wiring, generally resistance and connection corresponding to the compensation are added anew.

In the next step S26, states of current and voltage in a corrected trial circuit model are analyzed. The procedure is almost the same as that in the step S23. Namely, a trial circuit model is selected by the switch 27 shown in FIG. 8, then the analysis is carried out by the analysis portion 26. The result is stored in the trial circuit analysis result storage portion 29 by the switch 28. In this case, if necessary, the previous results are stored in the circuit analysis result storage portion 210 through the transfer device 211.

In the following step S27, whether the generated circuit is actually improved by the improvement plan is judged. To this end, the analysis result stored in the trial circuit analysis result storage portion 29 in FIG. 8 and the analysis results stored in the analysis result storage portion 210 are compared by the comparison portion 212.

In this case, items to be examined in the comparison are the first and the second constraint condition and the like. When the operation is carried out in accordance not only with the comparison of the number of violation cases to the items, but also with the estimation of degrees of the violation, the efficiency can be much improved. Then, the comparison result is transferred from the comparison portion 212 to the control portion 215 as a signal, so that a flow of processes and a flow of data are controlled.

The following step S28 in FIG. 9 is a process for cancelling the trial circuit result when the improvement is judged to be actually carried out in the step S27. In this case, the transfer of the trial circuit model to the circuit model storage portion 24 and the transfer of the trial circuit analysis result to the circuit analysis result storage portion 210 respectively shown in FIG. 9 are not carried out.

In a step S29, the improvement plan produced in the step S24 is corrected a little so as to investigate the necessity of reimprovement.

Incidentally, since the repetition of improvement is so planned as to be carried out only when the necessity of substantial improvement is recognized in the step S27, the loop of process including the step S27 can not be repeated infinitely.

In the next step S210, a process for transferring an improved circuit model to the circuit model storage portion 24, or transferring a trial circuit analysis result to the circuit analysis result storage portion 210 in FIG. 8 is carried out.

Then, in a step S211, it is investigated whether the improvement is sufficiently carried out or the constraint conditions are satisfied. The process is carried out by the comparison portion 212 shown in FIG. 8 with the conditional rule stored in the condition rule storage portion 213 in FIG. 8.

As the result, when an improved trial circuit satisfying the constraint conditions is found, the data at an abstract level of the power.ground wiring stored in the circuit model storage portion 24 are converted into polygon data for an actual pattern in the following step S212.

In such a manner, in the apparatus for power-source wiring design of semiconductor integrated circuits, a circuit model of power-source.ground wiring of a semiconductor integrated circuit is generated on trial by the trial circuit generating portion 22, and the electric characteristics of each of the sectional regions based on the circuit model are analyzed by the analysis portion 26. Then, by the comparison portion 212, the analysis result of the electric characteristics analyzed by the analysis portion 26 to the circuit model is compared with an analysis result of the electric characteristics by the analysis portion 26 to the previous circuit model. Thereafter, an improvement information is produced by the improvement plan producing portion 24 to improve the circuit model, and the result is given to the trial circuit generating portion 22.

By repeating such trial procedure several times, the optimization of power-source wiring design can be completed.

Figure 15:
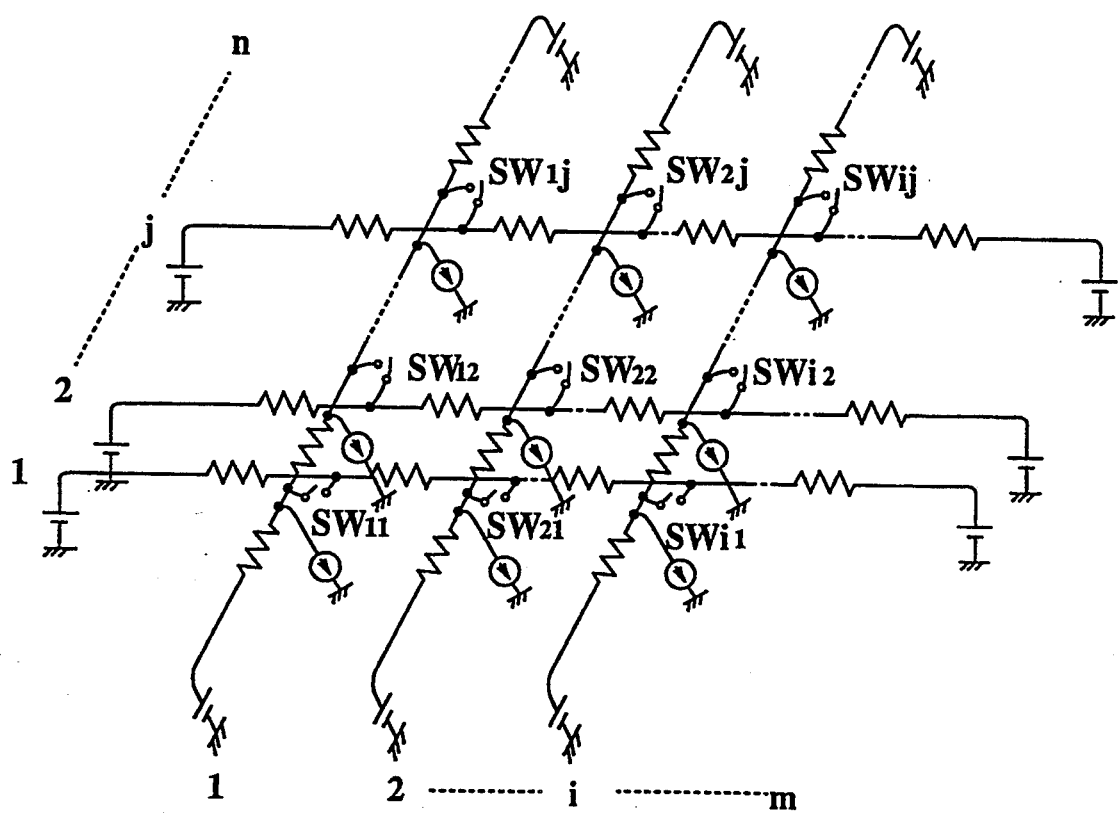
FIG. 15 is a diagram of equivalent circuits for explaining a principle of a modified example of an improving plan method in the second embodiment.

Incidentally, as another modified example of the improvement plan producing method, there is a method of deciding positions where the power source lines are inserted and positions where the power source vias are provided most suitably in a model in which the power source is arranged in a linearized form. FIG. 15 shows such a model for solving problems caused on producing the improvement plan. As compared with the circuit models given for analysis in FIGS. 4 and 5, this circuit model is so constructed that power-source compensation lines 1, 2, ..., j, ..., n are temporarily provided at positions capable of power-source compensation, wiring resistance is suitably incorporated as an imaginary model, and switches $sw_{ij}$ are inserted between respective contacts of the power-source compensation lines and power source lines 1, 2, ..., i, ..., m, so as to respectively carryout conceptional switching operation.

In such a model, the most suitable wiring condition for minimizing the wiring resource while satisfying the constraint conditions on the current density of power source lines and the variation of power-source potential is carried out by examining the most suitable combinations of connection in the respective lines by the switches $sw_{ij}$.

Figure 16:
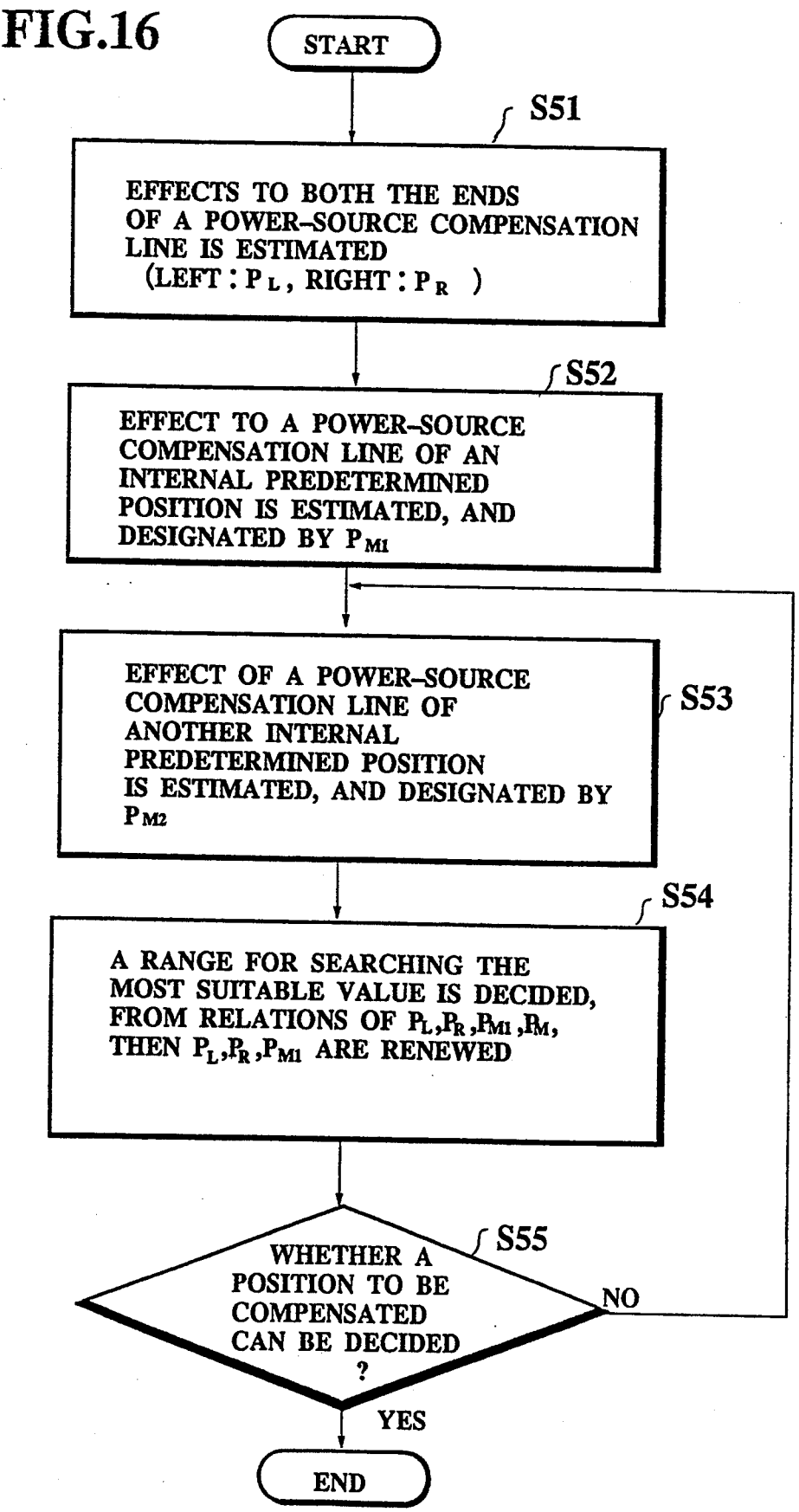
FIG. 16 is a flow chart of a process for deciding which power-source line be compensated with power in the modified example.
Figure 17:
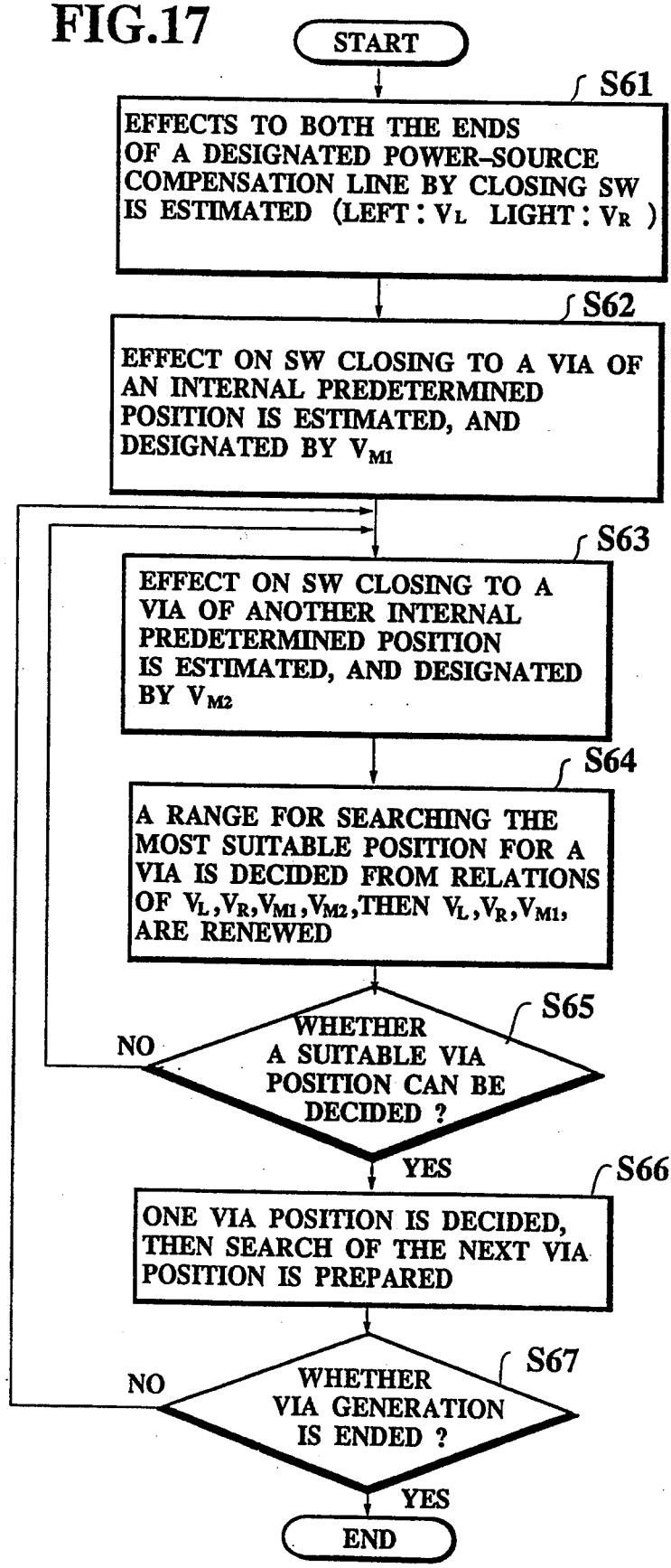
FIG. 17 is a flow chart of a process for deciding at which position a via be opened in the modified example.

This process is executed by flow charts shown in FIGS. 16 and 17, so as to decide positions where power-source compensation lines to be inserted and positions where vias to be provided on the power-source compensation lines. In both the procedures, since it is impossible to obtain differential coefficients of the respective estimation functions, a method in which the respective functions are directly calculated and intervals to be searched are successively reduced, for example a procedure based on Fibonacci search reported in Chapter 11 of "Computer-Aided Network Design", McGraw-Hill, 1972 by Calahan, is used.

The positional decision is carried out in a procedure as described in FIG. 16. However, this procedure is conducted on condition that there is actually the most suitable power-source wiring mode still unknown.

Figure 13:
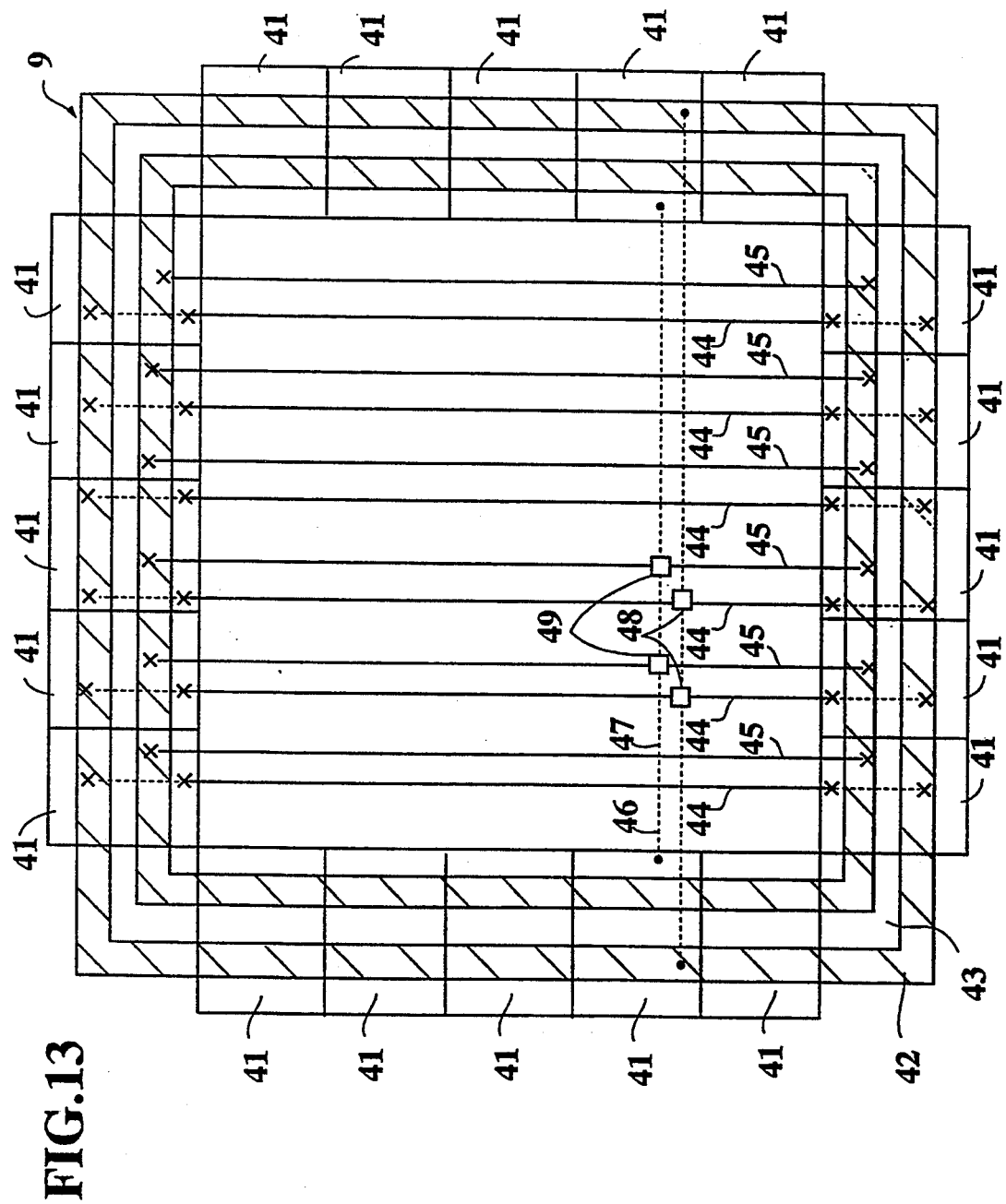
FIG. 13 is an explanatory diagram of a chip provided with power-source compensation in the second embodiment shown in FIG. 8.

In a step S51 in the flow chart of FIG. 16, estimation on improvement is carried out on supposition that switches provided at both the ends of the bottom line of the horizontal power-source compensation lines in FIG. 13 are closed respectively, and the results are stored as $P_L$, $P_R$.

In the next step S52, when the Fibonacci search method is utilized, estimation on improvement is carried out on supposition that switches related to a power-source compensation line near to a position decided by the method are closed, and the result is stored as $P_{M1}$.

In the following step S53, estimation on improvement is carried out on supposition that all the switches related to a power-source compensation line near to another position decided by the search method are closed, and the result is designated by $P_{M2}$.

Figure 18:
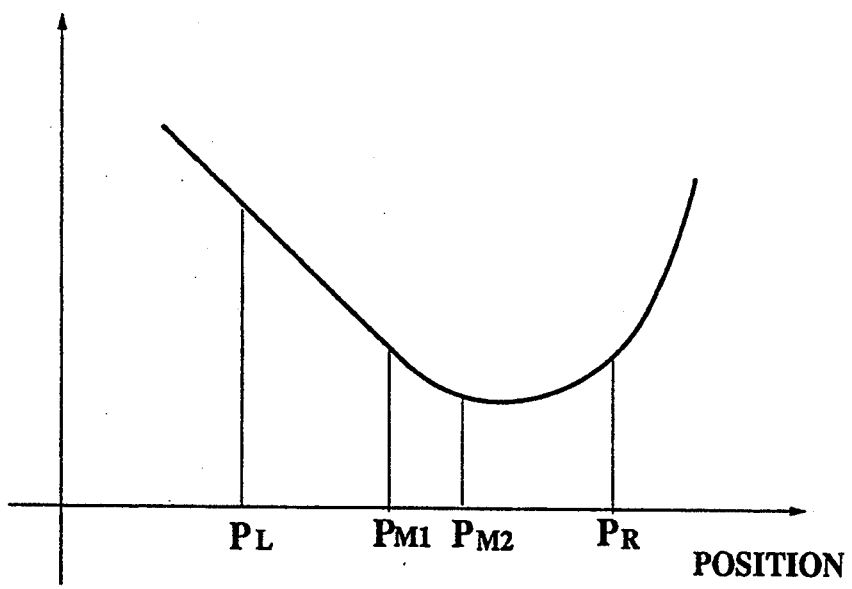
FIG. 18 is an explanatory diagram to explain a principle for deciding which power-source line be compensated with power.

Next, a range for searching the suitable value is decided in a step S54. In this step, if the results $P_L$, $P_R$, $P_{M1}$, $P_{M2}$ take positions as shown in FIG. 18, the following relations can be obviously understood:

Position of $P_L$ < Position of $P_{M1}$ < Position of $P_{M2}$ < Position of $P_R$ In such a case, when $P_{M1}$ > $P_{M2}$ as shown in FIG. 18, the next search interval for searching the minimum value is (Position of $P_{M1}$, Position of $P_R$), so that $P_{M2}$ can be used again. Accordingly, the information and values on positions are renewed as follows:

$P_L \leftarrow P_{M1}; P_{M1} \leftarrow P_{M2}; P_R \leftarrow P_R$

Figure 19:
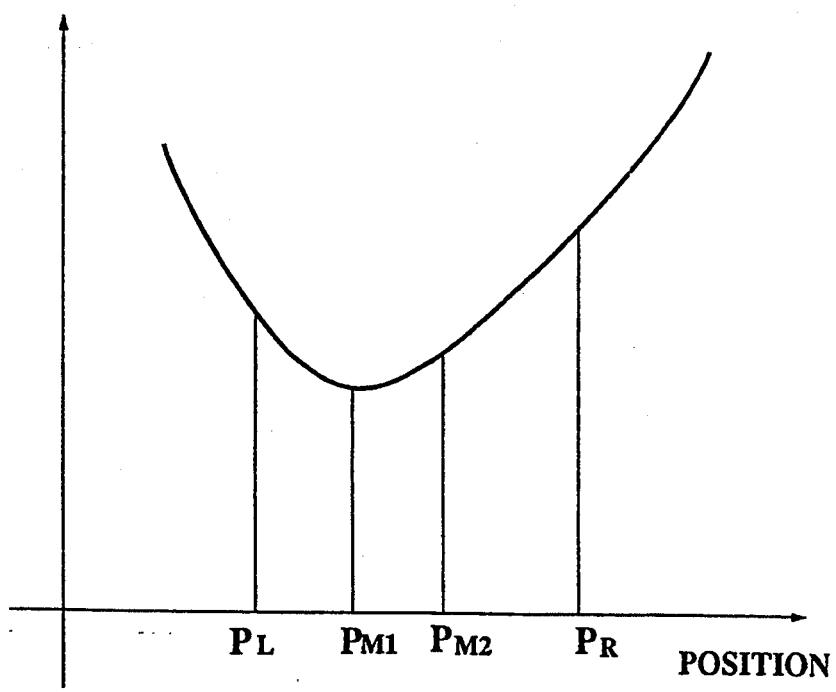
FIG. 19 is an explanatory diagram to explain a principle for deciding at which position a via be opened.

On the other hand, if $P_{M1}$ < $P_{M2}$ as shown in FIG. 19, the information and values on positions are renewed as follows:

$P_L \leftarrow P_L; P_{M1} \leftarrow P_{M2}; P_R \leftarrow P_{M2}$

In such a manner, the search interval can be narrowed successively. Then, when the interval is narrowed enough to decide a position to be given power-source compensation, the process loop is ended at a step S55.

Subsequently, in accordance with the flow chart shown in FIG. 17, it is decided how vias are prepared and the power source supplied with respect to the decided position for power-source compensation. In FIG. 17, the most suitable power-source compensation is decided considering which switches $sw_{ij}$ are used and how they can be reduced with respect to the power-source compensation position J decided by the procedure in FIG. 16 in the equivalent circuit in FIG. 15. Of course, if the vias are provided at all the possible positions, the largest amount of current can be supplied, this is disadvantageous to the wiring resource.

This process concerning vias is also based on the same interval search method as in the procedure in FIG. 16. In this case, the process is carried out on condition that the vias are not generated at both the ends of the interval. Namely, estimation on improvement is carried out on supposition that switches provided at both the ends of a predetermined horizontal power source line in FIG. 15 are closed, and the results are stored as $V_L$, $V_R$ (Step 61).

In the next step S62, when the Fibonacci search method is utilized, estimation on improvement is carried out on supposition that switches related to a via near to a position decided by the method are closed, and the result is stored as $V_{M1}$.

In the following step S63, estimation on improvement is carried out on supposition that all the switches related to a via near to another position decided by the search method are closed, and the result is designated by $V_{M2}$.

Next, a range for searching the suitable value is decided in a step S64. In this step, if the results $V_L$, $V_R$, $V_{M1}$, $V_{M2}$ take positions as follows:

Position of $V_L$ < Position of $V_{M1}$ < Position of $V_{M2}$ < Position of $V_R$ In such a case, when $V_{M1}$ > $V_{M2}$, the next search interval for searching the minimum value is (Position of $V_{M1}$, Position of $V_R$), so that $V_{M2}$ can be used again. Accordingly, the information and values on positions are renewed as follows:

$V_L \leftarrow V_{M1}; V_{M1} \leftarrow V_{M2}; V_R \leftarrow V_R$

On the other hand, if $V_{M1}$ < $V_{M2}$, the information and values on positions are renewed as follows:

$V_L \leftarrow V_L; V_{M1} \leftarrow V_{M2}; V_R \leftarrow V_{M2}$

In such a manner, the search interval can be narrowed successively. Then, when the interval is narrowed enough to decide a position to be given a via, the loop of process is ended at a step S65.

In a step S66, the decided position of a via is registered so as to utilize for the following analysis. Then, if necessary, the positional search operation for the next via is started.

In the following step S67, it is judged whether the generated via on a specific power source line satisfies the condition for ending the procedure. The ending condition varies with cases so that it is regarded as a predetermined number of times of the repetition of procedure or a fixed degree of improvement.

In such a manner, by combination of procedures in FIG. 16 and 17, it is possible that each suitable position to be compensated with an electric potential is found so as to carry out power-source compensation. Incidentally, to analyze a state of a circuit where switches are closed for the trial of compensation, an analysis method for a general direct current circuit can be used.

In summary, according to the present invention, an area of a semiconductor substrate is divided into a plurality of sectional regions by imaginary lattice set on the substrate. Circuit characteristics such as a current amount, power consumption and heat generation, of each of the sectional regions are obtained. The circuit characteristics are integrated over a row or a line of the sectional regions arranged vertically or parallel to one side of the substrate, and a current amount, power consumption and heat generation are obtained over all the sectional regions. Accordingly, it becomes possible to know quantitative conditions on the current, power consumption and heat generation at an optional position on the substrate, so that the power-source wiring design can be carried out very advantageously.

Moreover, display can be so obtained that each operation result through the procedure according to the present invention corresponds to each position on the semiconductor substrate. Thus, the conditions for wiring design can be easily grasped over all the substrate by dint of the display. Accordingly, the power-source wiring design can be carried out with ease.

Furthermore, according to the present invention, it is possible to automatically prepare a trial circuit model for the power-source wiring, and improve it so as to obtain the most suitable power-source.ground wiring model. Accordingly, an automatic design for power-source.ground wiring can be carried out with ease.

Various modifications will become possible for those skilled in the art after receiving the teachings of the present disclosure without departing from the scope thereof.

What is claimed is:

1. A method for power source wiring an integrated circuit, the method comprising the steps of:
   a) generating a wiring layout according to predetermined wiring rules;
   b) converting said wiring layout to a trial circuit having a plurality of four sided regions and storing said trial circuit;
   c) identifying electrical factors affecting electrical current drawn in said regions and, from said factors, determining an electrical current value flowing into a node at an intersection of power source lines in each said region;
   d) identifying an initial estimate of power source current to ground and a node voltage in each said region, determining admittance of said power source lines between said node and a peripheral node of said region from a selected resistivity and width of said power source lines, and determining therefrom a voltage at a said periphery of said region;
   e) calculating a new value of said node voltage from said admittance and said current and subsequently calculating a new value for said node voltage;
   f) repeating steps c) and d) until said voltage at said periphery achieves a predetermined accuracy with respect to a previously determined voltage at said periphery;
   g) determining if said power source wiring layout produces in said power source wiring lines currents and voltage drops within predetermined levels;
   h) if said currents and voltage drops are in said power source wiring lines are not within said predetermined levels, generating a plan, according to predetermined improving rules, for improving said power source wiring layout to obtain current levels and voltage drops in said power source wiring within said predetermined levels and repeating steps a) through g); and
   i) when said power source wiring layout produces in said power source wiring lines currents and voltages within said predetermined levels, converting said trial circuit into a practical wiring layout.

2. The method recited in claim 1 wherein the step of generating an improvement plan comprises:
   constraining current density to below a predetermined maximum based on power line widths and electromigration properties of metal used in forming said power source lines;
   constraining a voltage drop from power source wiring ground resistance to a first fixed value;
   constraining voltage variations between each node in said lattice to less than a second fixed value; and
   minimizing a total sum of all power source line widths and a number of vias required in said power source wiring layout.

3. The method recited in claim 2 wherein the step of generating an improving plan further comprises:
   providing power source ground wiring at input-output cells on a peripheral portion of said chip and providing said power source wiring lines to cells in a core portion of said chip;
   providing power source compensation wiring in accordance with positional power consumption in said regions where voltage and current constraints have not been met by said wiring layout.

4. The method recited in claim 2 further comprising:
   identifying said regions where current on vertical ones of said power source lines exceeds said first fixed value;
   identifying ones of said regions where voltage drops along horizontal ones of said power source lines exceed said second fixed value;
   identifying a power source wiring line with the largest number of regions exceeding said first and second fixed values;
   positioning vias to supply current from said horizontal ones of said power source lines to provide compensation to said vertical ones of said power source lines at points where current exceeds said first fixed value.

5. The method recited in claim 4 wherein said horizontal ones of said power source lines are used for power source line compensation if located near a one of said regions where voltage drops along a said horizontal one of said power source lines exceed said second fixed value, and otherwise another horizontal power source compensation wiring is generated.

6. The method recited in claim 5 wherein, if a said one of said horizontal ones of said power source lines is used, a via is generated at a point where current on a vertical one of said power source lines exceeds said first fixed value.

7. The method recited in claim 2 wherein generating said improvement plan comprises:
   providing power source compensation lines at positions capable of compensation and switches between said power source lines and said compensation lines;
   determining the most suitable power line compensation by selectively activating and deactivating said switches.

8. The method recited in claim 7 further comprising the steps of:
   estimating and storing the effects of closing said switches at opposite ends of one of said compensation lines;
   estimating the improvement provided to a first predetermined position by said switch closing;
   estimating the improvement provided to a second predetermined position by said switch closing;
   applying an interval search method to compare said improvements, determine if said improvements are in a range wherein further improvement is impractical and, if not, to select other switches to be closed.

9. The method recited in claim 8 wherein said interval search is used to position vias.

10. A power-source wiring design apparatus for integrated circuits, comprising:
    (a) means for dividing an entire substrate into regions having electrical characteristics;
    (b) means for extracting said electric characteristics of said regions;
    (c) means for obtaining circuit operational characteristics of each of said regions to obtain electric power consumption characteristics of said regions;
    (d) means for displaying results obtained by said means for obtaining operational characteristics; and
    (e) means for designing power-source wiring of said entire substrate on the basis of said results displayed by said display means,
    wherein said means for obtaining operational characteristics comprises: i) a circuit equation preparing portion for preparing a circuit equation for obtaining electric potentials of power source lines, an amount of electric current, power consumption or an amount of heat generation, and ii) a circuit equation analysis portion for solving said circuit equation to obtain said circuit operational characteristics of each said region, and
    wherein said circuit equation analysis portion is constructed to calculate power consumption using an average switching probability of logic gates included in each of said regions.

11. The apparatus recited in claim 10, wherein said extracting means extracts the number of gates, dimensions of transistors, load capacitance of gates, and clock frequencies related to gates of each of said regions as electric characteristic parameters.

12. The apparatus recited claim 10, wherein each said region has four sides and wherein the circuit equation preparing portion is constructed to calculate a resistance value of power source lines crossing said four sides of each said region, and to prepare a circuit node equation by calculating an amount of current flowing in each of said regions.

13. A method of designing power-source wiring of semiconductor integrated circuits, the method comprising the steps of:
    (a) dividing a substrate into regions;
    (b) extracting electric characteristics of each of said regions on the semiconductor substrate;
    (c) obtaining circuit operational characteristics of each of said regions to obtain electric power consumption characteristic of said region;
    (d) displaying a said operational characteristic; and
    (e) designing said power source wiring using said displayed operational characteristic,
    wherein the step (b) comprises extracting the number of gates, dimensions of transistors, load capacitance of gates, and clock frequencies related to gates of each of said regions as electric characteristic parameters,
    wherein the step (c) comprises i) a circuit equation preparing step for preparing a circuit equation for obtaining electric potentials of power source lines, an amount of electric current, power consumption or an amount of heat generation, and ii) a circuit equation analysis step for solving said circuit equation so as to obtain circuit characteristics of each said region, and
    wherein in said circuit equation preparing step power consumption is determined assuming an average switching probability of logic gates included in each of said regions.

14. The method according to claim 13, wherein each said region has four sides and wherein in said circuit equation preparing step a resistance value of power source lines crossing said four sides of each of said regions is determined, and a circuit node equation is prepared by calculating an amount of current flowing in each said region.

15. A power-source wiring design apparatus for integrated circuits, comprising:
    (a) trial circuit generating means for generating a circuit model of power-source ground wiring of an integrated circuit to be tried, said trial circuit generating means dividing said model into regions;
    (b) means for analyzing electrical characteristics related to power consumption of each of said regions of said circuit model;
    (c) means for comparing electric characteristics obtained by said analyzing means for analysis of a circuit model to electric characteristics previously obtained by said analyzing means for analysis of a previous circuit model; and
    (d) means for determining if said power source requires improvement and generating information of a plan to improve said power source wiring in said circuit model in accordance with results of a comparison by said comparing means, and for providing said information to said trial circuit generating means for generating a revised circuit model if said power source wiring requires improvement,
    wherein said means for analyzing comprises lattice setting means for setting a hypothetical lattice on the circuit model, means for extracting electric characteristics of each of said regions of said circuit model divided by said lattice, and means for obtaining circuit characteristics of each of said regions, wherein said means for obtaining circuit characteristics comprises: i) a circuit equation preparing portion for preparing a circuit equation for obtaining electric potentials of power source lines, an amount of electric current, power consumption or an amount of heat generation, and ii) a circuit equation analysis portion for solving said circuit equation to obtain said circuit operational characteristics of said region, and wherein said circuit equation preparing portion is constructed to determine power consumption assuming an average switching probability of logic gates included in each of said regions.

16. The apparatus recited in claim 15, wherein the number of gates, dimensions of transistors, load capacitance of gates, and clock frequencies related to gates of each of said regions is extracted by said extracting means as electric characteristic parameters.

17. The apparatus recited in claim 15, wherein each said region has four sides and wherein said circuit equation preparing portion is constructed to determine a resistance value of power source lines crossing said four sides of each of said regions, and to prepare a circuit node equation by determining an amount of current flowing in each of said regions.

* * * * *